United States Patent
Yuki et al.

(10) Patent No.: US 11,964,908 B2
(45) Date of Patent: Apr. 23, 2024

(54) TEMPERED GLASS SHEET AND METHOD FOR MANUFACTURING SAME

(71) Applicant: Nippon Electric Glass Co., Ltd., Shiga (JP)

(72) Inventors: Ken Yuki, Shiga (JP); Ryota Suzuki, Shiga (JP); Tomonori Ichimaru, Shiga (JP); Kiyotaka Kinoshita, Shiga (JP); Yuta Nagano, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 17/417,523

(22) PCT Filed: Dec. 24, 2019

(86) PCT No.: PCT/JP2019/050571
§ 371 (c)(1),
(2) Date: Jun. 23, 2021

(87) PCT Pub. No.: WO2020/138062
PCT Pub. Date: Jul. 2, 2020

(65) Prior Publication Data
US 2022/0041493 A1    Feb. 10, 2022

(30) Foreign Application Priority Data

Dec. 25, 2018 (JP) ................ 2018-240718
May 23, 2019 (JP) ................ 2019-096572
Sep. 10, 2019 (JP) ................ 2019-164611

(51) Int. Cl.
*B32B 15/04*    (2006.01)
*B32B 17/06*    (2006.01)
(Continued)

(52) U.S. Cl.
CPC ............. *C03C 3/11* (2013.01); *C03C 3/097* (2013.01); *C03C 4/18* (2013.01); *C03C 21/002* (2013.01); *C03C 2204/00* (2013.01)

(58) Field of Classification Search
CPC ..................................... C03C 21/002
(Continued)

(56) References Cited

U.S. PATENT DOCUMENTS 10,633,279 B2 *  4/2020  Gross ................ C03C 3/097
10,906,834 B2 *  2/2021  Gross ................ C03C 3/083
(Continued)

FOREIGN PATENT DOCUMENTS

JP    2006-83045    3/2006
JP    2011-510903   4/2011
(Continued)

OTHER PUBLICATIONS

International Search Report dated Mar. 17, 2020 in International (PCT) Application No. PCT/JP2019/050571.
(Continued)

*Primary Examiner* — Lauren R Colgan
(74) *Attorney, Agent, or Firm* — Wenderoth, Lind & Ponack, L.L.P.

(57) ABSTRACT

The present invention provides a tempered glass sheet having a compressive stress layer in a surface thereof, the tempered glass sheet including as a glass composition, in terms of mol %, 50% to 80% of $SiO_2$, 8% to 25% of $Al_2O_3$, 0% to 10% of $B_2O_3$, 3% to 15% of $Li_2O$, 3% to 21% of $Na_2O$, 0% to 10% of $K_2O$, 0% to 10% of MgO, 0% to 10% of ZnO, and 0% to 15% of $P_2O_5$.

17 Claims, 1 Drawing Sheet

(51) Int. Cl.
*C03C 3/097* (2006.01)
*C03C 3/11* (2006.01)
*C03C 4/18* (2006.01)
*C03C 21/00* (2006.01)

(58) Field of Classification Search
USPC .......................................... 428/426, 432, 410
See application file for complete search history.

(56) References Cited

U.S. PATENT DOCUMENTS

| | | | |
|---|---|---|---|
| 11,312,656 B2* | 4/2022 | Imakita | C03C 3/083 |
| 11,724,965 B2* | 8/2023 | Schneider | C03C 21/002 |
| | | | 65/30.14 |
| 2006/0063009 A1 | 3/2006 | Naitou et al. | |
| 2009/0202808 A1 | 8/2009 | Glaesemann et al. | |
| 2010/0009154 A1 | 1/2010 | Allan et al. | |
| 2012/0321898 A1* | 12/2012 | Meinhardt | C03C 21/002 |
| | | | 428/410 |
| 2013/0086946 A1 | 4/2013 | Glaesemann et al. | |
| 2013/0095310 A1 | 4/2013 | Glaesemann et al. | |
| 2013/0224492 A1* | 8/2013 | Bookbinder | C03C 21/002 |
| | | | 65/30.14 |
| 2014/0335335 A1 | 11/2014 | Koch, III et al. | |
| 2015/0064473 A1* | 3/2015 | Dejneka | C03C 21/002 |
| | | | 501/63 |
| 2015/0329406 A1 | 11/2015 | Kawamoto et al. | |
| 2015/0376057 A1 | 12/2015 | Koch, III et al. | |
| 2016/0023944 A1 | 1/2016 | Bookbinder et al. | |
| 2016/0347655 A1* | 12/2016 | Meinhardt | C03C 3/093 |
| 2016/0376186 A1* | 12/2016 | Gross | C03C 21/002 |
| | | | 361/679.26 |
| 2017/0022093 A1* | 1/2017 | DeMartino | B32B 17/10137 |
| 2017/0197869 A1* | 7/2017 | Beall | C03C 3/093 |
| 2017/0197876 A1 | 7/2017 | Oram et al. | |
| 2017/0295657 A1 | 10/2017 | Gross et al. | |
| 2017/0297956 A1 | 10/2017 | Bookbinder et al. | |
| 2017/0341973 A1* | 11/2017 | Gross | C03C 3/097 |
| 2017/0355640 A1* | 12/2017 | Oram | C03C 21/002 |
| 2018/0105461 A1* | 4/2018 | Schneider | C03C 17/30 |
| 2019/0161386 A1* | 5/2019 | Gross | C03C 3/083 |
| 2019/0161390 A1* | 5/2019 | Gross | H05K 5/03 |
| 2019/0276355 A1* | 9/2019 | Meinhardt | C03C 21/002 |
| 2019/0382302 A1 | 12/2019 | Xue et al. | |

FOREIGN PATENT DOCUMENTS

| | | |
|---|---|---|
| JP | 2011-527661 | 11/2011 |
| JP | 2013-520388 | 6/2013 |
| JP | 2016-524581 | 8/2016 |
| JP | 2019-99460 | 6/2019 |
| TW | 201341324 | 10/2013 |
| TW | 201733954 | 10/2017 |
| TW | 201827364 | 8/2018 |
| WO | 2009/099614 | 8/2009 |
| WO | 2013/130653 | 9/2013 |
| WO | 2014/098111 | 6/2014 |
| WO | 2014/182640 | 11/2014 |
| WO | 2017/123596 | 7/2017 |
| WO | 2017/177109 | 10/2017 |
| WO | 2018/152845 | 8/2018 |
| WO | 2018/199046 | 11/2018 |
| WO | 2019/108762 | 6/2019 |

OTHER PUBLICATIONS

Office Action dated May 4, 2021 in corresponding Taiwanese Application No. 108136510 with English translation of Search Report.

Tetsuro Izumitani et al., "New Glass and Physical Properties Thereof," First edition, Management System Laboratory. Co., Ltd., Aug. 20, 1984, pp. 451-498 w/partial English translation.

International Preliminary Report on Patentability and Written Opinion of the International Searching Authority dated Jun. 16, 2021 in International (PCT) Application No. PCT/JP2019/050571.

Notice of Reasons for Refusal dated Jul. 21, 2023 in corresponding Japanese Patent Application No. 2020-551164, with English language translation.

Office Action dated May 5, 2023 in corresponding Taiwanese Patent Application No. 108147447, with English translation of Search Report.

Notice of Reasons for Refusal dated May 2, 2023 in corresponding Japanese Patent Application No. 2020-551165, with English translation.

Notice of Reasons for Refusal issued Dec. 13, 2023 in corresponding Japanese Patent Application No. 2020-563298, with English machine translation.

* cited by examiner

TEMPERED GLASS SHEET AND METHOD FOR MANUFACTURING SAME

TECHNICAL FIELD

The present invention relates to a tempered glass sheet and a method of manufacturing the same, and more particularly, to a tempered glass sheet suitable as a cover glass for a touch panel display of a cellular phone, a digital camera, a personal digital assistant (PDA), or the like, and a method of manufacturing the same.

BACKGROUND ART

In applications such as a cellular phone, a digital camera, and a personal digital assistant (PDA), a tempered glass sheet obtained through ion exchange treatment is used as a cover glass for a touch panel display (see Patent Literature 1 and Non Patent Literature 1).

CITATION LIST

Patent Literature

Patent Literature 1: JP 2006-83045 A
Patent Literature 2: JP 2016-524581 A
Patent Literature 3: JP 2011-510903 A

Non Patent Literature

Non Patent Literature 1: Tetsuro Izumitani et al., "New glass and physical properties thereof," First edition, Management System Laboratory. Co., Ltd., Aug. 20, 1984, p. 451-498

SUMMARY OF INVENTION

Technical Problem

Incidentally, when a smartphone is dropped onto a road surface or the like by mistake, the smartphone becomes unusable in some cases owing to breakage of a cover glass. Accordingly, in order to avoid such situations, it is important to increase the strength of the tempered glass sheet.

As a method of increasing the strength of the tempered glass sheet, it is effective to increase a depth of layer. Specifically, when the cover glass collides with the road surface at the time of dropping of the smartphone, protrusions or sand grains on the road surface penetrate into the cover glass to reach a tensile stress layer, which leads to the breakage of the cover glass. In view of the foregoing, when the depth of layer of a compressive stress layer is increased, the protrusions or the sand grains on the road surface are less liable to reach the tensile stress layer, and thus the breakage probability of the cover glass can be reduced.

Lithium aluminosilicate glass is advantageous in obtaining a large depth of layer. In particular, when a glass sheet to be tempered, which is formed of the lithium aluminosilicate glass, is immersed in a molten salt containing $NaNO_3$ to ion exchange a Li ion in the glass with a Na ion in the molten salt, a tempered glass sheet having a large depth of layer can be obtained.

However, with related-art lithium aluminosilicate glass, there is a risk in that the compressive stress value of the compressive stress layer may be reduced excessively. Meanwhile, when a glass composition is designed so as to increase the compressive stress value of the compressive stress layer, there is a risk in that chemical stability may be reduced. Further, it is difficult to form the lithium aluminosilicate glass into a sheet shape because devitrified stones are liable to be generated at the time of forming owing to an unbalanced glass composition.

The present invention has been made in view of the above-mentioned circumstances, and a technical object of the present invention is to provide a tempered glass sheet, which can be formed into a sheet shape, is excellent in chemical stability, and is less liable to be broken at the time of dropping.

Solution to Problem

The inventors of the present invention have made various investigations, and as a result, have found that, when the glass composition is restricted to a predetermined range, the above-mentioned technical object can be achieved. Thus, the finding is proposed as the present invention. That is, according to one embodiment of the present invention, there is provided a tempered glass sheet having a compressive stress layer in a surface thereof, the tempered glass sheet comprising as a glass composition, in terms of mol %, 50% to 80% of $SiO_2$, 8% to 25% of $Al_2O_3$, 0% to 10% of $B_2O_3$, 3% to 15% of $Li_2O$, 3% to 21% of $Na_2O$, 0% to 10% of $K_2O$, 0% to 10% of $MgO$, 0% to 10% of $ZnO$, and 0% to 15% of $P_2O_5$.

In addition, it is preferred that the tempered glass sheet according to the one embodiment of the present invention satisfy the following relationship: a molar ratio $([Na_2O]-[Li_2O])/([Al_2O_3]+[B_2O_3]+[P_2O_5]) \le 0.29$. Herein, the "$[Na_2O]$" refers to the content of $Na_2O$ in terms of mol %. The "$[Li_2O]$" refers to the content of $Li_2O$ in terms of mol %. The "$[Al_2O_3]$" refers to the content of $Al_2O_3$ in terms of mol %. The "$[B_2O_3]$" refers to the content of $B_2O_3$ in terms of mol %. The "$[P_2O_5]$" refers to the content of $P_2O_5$ in terms of mol %. The "$([Na_2O]-[Li_2O])/([Al_2O_3]+[B_2O_3]+[P_2O_5])$" refers to a value obtained by dividing a value obtained by subtracting the content of $Li_2O$ from the content of $Na_2O$ by the total content of $Al_2O_3$, $B_2O_3$, and $P_2O_5$.

In addition, it is preferred that the tempered glass sheet according to the one embodiment of the present invention satisfy the following relationship: a molar ratio $([B_2O_3]+[Na_2O]-[P_2O_5])/([Al_2O_3]+[Li_2O]) \ge 0.30$. Herein, the "$([B_2O_3]+[Na_2O]-[P_2O_5])/([Al_2O_3]+[Li_2O])$" refers to a value obtained by dividing a value obtained by subtracting the content of $P_2O_5$ from the total content of $B_2O_3$ and $Na_2O$ by the total content of $Al_2O_3$ and $Li_2O$.

In addition, the tempered glass sheet according to the one embodiment of the present invention comprises 12 mol % or more of $([Li_2O]+[Na_2O]+[K_2O])$, and satisfies the following relationship: $[SiO_2]+1.2\times[P_2O_5]-3\times[Al_2O_3]-2\times[Li_2O]-1.5\times[Na_2O]-[K_2O]-[B_2O_3] \ge -22$ mol %. Herein, the "$[K_2O]$" refers to the content of $K_2O$ in terms of mol %. The "$[SiO_2]$" refers to the content of $SiO_2$ in terms of mol %. The "$([Li_2O]+[Na_2O]+[K_2O])$" refers to the total content of $Li_2O$, $Na_2O$, and $K_2O$. The "$[SiO_2]+1.2\times[P_2O_5]-3\times[Al_2O_3]-2\times[Li_2O]-1.5\times[Na_2O]-[K_2O]-[B_2O_3]$" refers to a value obtained by subtracting a content three times as large as the content of $Al_2O_3$, a content two times as large as the content of $Li_2O$, a content 1.5 times as large as the content of $Na_2O$, the content of $K_2O$, and the content of $B_2O_3$ from the sum of the content of $SiO_2$ and a content 1.2 times as large as the content of $P_2O_5$.

In addition, it is preferred that the tempered glass sheet according to the one embodiment of the present invention have a content of $P_2O_3$ of from 0.1 mol % to 2.3 mol %.

In addition, it is preferred that the tempered glass sheet according to the one embodiment of the present invention have a content of $B_2O_3$ of from 0.1 mol % to 4 mol %.

In addition, it is preferred that, in the tempered glass sheet according to the one embodiment of the present invention, the compressive stress layer have a compressive stress value of from 200 MPa to 1,000 MPa on an outermost surface. Herein, the "compressive stress value on the outermost surface" and the "depth of layer" each refer to a value measured based on a retardation distribution curve observed, for example, with a scattered light photoelastic stress meter SLP-1000 (manufactured by Orihara Industrial Co., Ltd.). Moreover, the "depth of layer" refers to a depth at which the stress value becomes zero. In calculation of the stress characteristics, the refractive index and the optical elastic constant of each measurement sample are set to 1.51 and 30.1 [(nm/cm)/MPa], respectively.

In addition, it is preferred that, in the tempered glass sheet according to the one embodiment of the present invention, the compressive stress layer have a depth of layer of from 50 μm to 200 μm.

In addition, it is preferred that the tempered glass sheet according to the one embodiment of the present invention have a temperature at a viscosity at high temperature of $10^{2.5}$ dPa·s of less than 1,650° C. Herein, the "temperature at a viscosity at high temperature of $10^{2.5}$ dPa·s" may be measured, for example, by a platinum sphere pull up method.

In addition, it is preferred that the tempered glass sheet according to the one embodiment of the present invention comprise overflow-merged surfaces in a middle portion thereof in a sheet thickness direction, that is, the tempered glass sheet be formed by an overflow down-draw method. Herein, the "overflow down-draw method" is a method involving causing molten glass to overflow from both sides of forming body refractory, and subjecting the overflowing molten glasses to down-draw downward while the molten glasses are merged at the lower end of the forming body refractory, to thereby manufacture a glass sheet.

In addition, it is preferred that the tempered glass sheet according to the one embodiment of the present invention be used as a cover glass for a touch panel display.

In addition, the tempered glass sheet according to the one embodiment of the present invention is a tempered glass sheet having a compressive stress layer in a surface thereof, the tempered glass sheet comprising, as the glass composition, 17 mol % or more of $Al_2O_3$, 1 mol % or more of $P_2O_5$, and 12 mol % or more of ($[Li_2O]+[Na_2O]+[K_2O]$), and satisfying the following relationship: $[SiO_2]+1.2\times[P_2O_5]-3\times[Al_2O_3]-2\times[Li_2O]-1.5\times[Na_2O]-[K_2O]-[B_2O_3] \geq -22$ mol %. With this configuration, glass that can be formed into a sheet shape and further has high acid resistance while being increased in ion exchange performance becomes easily obtainable.

In addition, it is preferred that the tempered glass sheet according to the one embodiment of the present invention have a content of $Fe_2O_3$ of from 0.001 mol % to 0.1 mol %.

In addition, it is preferred that the tempered glass sheet according to the one embodiment of the present invention have a content of $TiO_2$ of from 0.001 mol % to 0.1 mol %.

In addition, it is preferred that the tempered glass sheet according to the one embodiment of the present invention have a content of $SnO_2$ of from 0.01 mol % to 1 mol %.

In addition, it is preferred that the tempered glass sheet according to the one embodiment of the present invention have a content of Cl of from 0.001 mol % to 0.1 mol %.

In addition, it is preferred that the tempered glass sheet according to the one embodiment of the present invention have a stress profile having at least a first peak, a second peak, a first bottom, and a second bottom in a thickness direction.

According to one embodiment of the present invention, there is provided a glass sheet to be tempered, comprising as a glass composition, in terms of mol %, 50% to 80% of $SiO_2$, 8% to 25% of $Al_2O_3$, 0% to 10% of $B_2O_3$, 3% to 15% of $Li_2O$, 3% to 21% of $Na_2O$, 0% to 10% of $K_2O$, 0% to 10% of MgO, 0% to 10% of ZnO, and 0% to 15% of $P_2O_5$.

According to one embodiment of the present invention, there is provided a method of manufacturing a tempered glass sheet, comprising: a preparation step of preparing a glass sheet to be tempered including as a glass composition, in terms of mol %, 50% to 80% of $SiO_2$, 8% to 25% of $Al_2O_3$, 0% to 10% of $B_2O_3$, 3% to 15% of $Li_2O$, 3% to 21% of $Na_2O$, 0% to 10% of $K_2O$, 0% to 10% of MgO, 0% to 10% of ZnO, and 0% to 15% of $P_2O_5$; and an ion exchange step of subjecting the glass sheet to be tempered to ion exchange treatment a plurality of times, to thereby obtain a tempered glass sheet having a compressive stress layer in a surface thereof.

DESCRIPTION OF EMBODIMENTS

Figure 1:
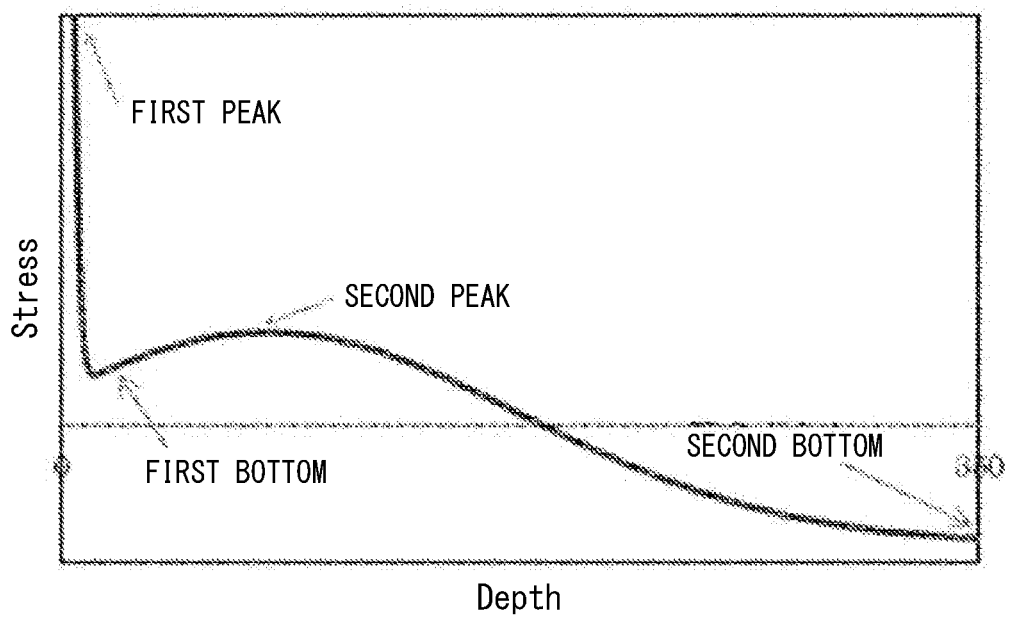
FIG. 1 is an explanatory view for illustrating an example of a stress profile having a first peak, a second peak, a first bottom, and a second bottom.

A tempered glass sheet (glass sheet to be tempered) of the present invention comprises as a glass composition, in terms of mol %, 50% to 80% of $SiO_2$, 8% to 25% of $Al_2O_3$, 0% to 10% of $B_2O_3$, 3% to 15% of $Li_2O$, 3% to 21% of $Na_2O$, 0% to 10% of $K_2O$, 0% to 10% of MgO, 0% to 10% of ZnO, and 0% to 15% of $P_2O_5$. Reasons why the content ranges of the components are restricted are described below. In the description of the content range of each component, the expression "%" means "mol %" unless otherwise specified.

$SiO_2$ is a component that forms a glass network. When the content of $SiO_2$ is too small, vitrification does not occur easily, and a thermal expansion coefficient becomes too high, with the result that thermal shock resistance is liable to be reduced. Accordingly, a suitable lower limit of the content range of $SiO_2$ is 50% or more, 55% or more, 57% or more, or 59% or more, particularly 61% or more. Meanwhile, when the content of $SiO_2$ is too large, meltability and formability are liable to be reduced, and the thermal expansion coefficient is excessively reduced, with the result that it becomes difficult to match the thermal expansion coefficient with those of peripheral materials. Accordingly, a suitable upper limit of the content range of $SiO_2$ is 80% or less, 70% or less, 68% or less, 66% or less, or 65% or less, particularly 64.5% or less.

$Al_2O_3$ is a component that improves ion exchange performance, and is also a component that increases a strain point, a Young's modulus, a fracture toughness, and a Vickers hardness. Accordingly, a suitable lower limit of the content range of $Al_2O_3$ is 8% or more, 10% or more, 12% or more, 13% or more, 14% or more, 14.4% or more, 15% or more, 15.3% or more, 15.6% or more, 16% or more, 16.5% or more, 17% or more, 17.2% or more, 17.5% or more, 17.8% or more, 18% or more, more than 18%, or 18.3% or more, particularly 18.5% or more, 18.6% or more, 18.7% or more, or 18.8% or more. Meanwhile, when the content of $Al_2O_3$ is too large, a viscosity at high temperature is increased, with the result that the meltability and the formability are liable to be reduced. In addition, a devitrified crystal is liable to be precipitated in the glass, and it becomes difficult to form the glass into a sheet shape by an overflow down-draw method or the like. Particularly when the glass is formed into a sheet shape by an overflow down-draw method involving using alumina-based refractory as forming body refractory, a devitrified crystal of spinel is liable to be precipitated at an interface with the alumina-based refractory. Further, acid resistance is reduced, with the result that it becomes difficult to subject the glass to an acid treatment step. Accordingly, a suitable upper limit of the content range of $Al_2O_3$ is 25% or less, 21% or less, 20.5% or less, 20% or less, 19.9% or less, 19.5% or less, or 19.0% or less, particularly 18.9% or less. When the content of $Al_2O_3$, which has a large influence on the ion exchange performance, is set to fall with the suitable ranges, a profile having a first peak, a second peak, a first bottom, and a second bottom becomes easily formable.

$B_2O_3$ is a component that reduces the viscosity at high temperature and a density, and stabilizes the glass to cause less precipitation of a crystal, to thereby reduce a liquidus temperature. When the content of $B_2O_3$ is too small, a depth of layer obtained through ion exchange between a Li ion in the glass and a Na ion in a molten salt is excessively increased, with the result that the compressive stress value ($CS_{Na}$) of a compressive stress layer is liable to be reduced. In addition, there is a risk in that the glass may be unstable, and denitrification resistance may be reduced. Accordingly, a suitable lower limit of the content range of $B_2O_3$ is 0% or more, 0.1% or more, 0.2% or more, 0.5% or more, 0.6% or more, 0.7% or more, 0.8% or more, or 0.9% or more, particularly 1% or more. Meanwhile, when the content of $B_2O_3$ is too large, there is a risk in that the depth of layer may be reduced. In particular, the efficiency of ion exchange between a Na ion in the glass and a K ion in a molten salt is liable to be reduced, and the depth of layer ($DOL\_ZERO_K$) of the compressive stress layer is liable to be reduced. Accordingly, a suitable upper limit of the content range of $B_2O_3$ is 10% or less, 5% or less, 4% or less, 3.8% or less, 3.5% or less, 3.3% or less, 3.2% or less, 3.1% or less, or 3% or less, particularly 2.9% or less. When the content of $B_2O_3$ is set to fall within the suitable ranges, the profile having a first peak, a second peak, a first bottom, and a second bottom becomes easily formable.

$Li_2O$ is an ion exchange component, and particularly, is an essential component for obtaining a large depth of layer through ion exchange between a Li ion in the glass and a Na ion in the molten salt. In addition, $Li_2O$ is a component that reduces the viscosity at high temperature to improve the meltability and the formability, and is also a component that increases the Young's modulus. Accordingly, a suitable lower limit of the content range of $Li_2O$ is 3% or more, 4% or more, 5% or more, 5.5% or more, 6.5% or more, 7% or more, 7.3% or more, 7.5% or more, or 7.8% or more, particularly 8% or more. Accordingly, a suitable upper limit of the content range of $Li_2O$ is 15% or less, 13% or less, 12% or less, 11.5% or less, 11% or less, 10.5% or less, or less than 10%, particularly 9.9% or less, 9% or less, or 8.9% or less.

$Na_2O$ is an ion exchange component, and is also a component that reduces the viscosity at high temperature to improve the meltability and the formability. In addition, $Na_2O$ is a component that improves the devitrification resistance, and is particularly a component that suppresses devitrification caused by a reaction with alumina-based refractory. Accordingly, a suitable lower limit of the content range of $Na_2O$ is 3% or more, 4% or more, 5% or more, 6% or more, 7% or more, 7.5% or more, 8% or more, 8.5% or more, or 8.8% or more, particularly 9% or more. Meanwhile, when the content of $Na_2O$ is too large, the thermal expansion coefficient is excessively increased, and the thermal shock resistance is liable to be reduced. In addition, the glass composition loses its component balance, and the devitrification resistance may be reduced contrarily. Accordingly, a suitable upper limit of the content range of $Na_2O$ is 21% or less, 20% or less, or 19% or less, particularly 18% or less, 15% or less, 13% or less, or 11% or less, particularly 10% or less.

$K_2O$ is a component that reduces the viscosity at high temperature to improve the meltability and the formability. However, when the content of $K_2O$ is too large, the thermal expansion coefficient is excessively increased, and the thermal shock resistance is liable to be reduced. In addition, the compressive stress value of the compressive stress layer on the outermost surface is liable to be reduced. Accordingly, a suitable upper limit of the content range of $K_2O$ is 10% or less, 7% or less, 6% or less, 5% or less, 4% or less, 3% or less, 2% or less, 1.5% or less, 1% or less, less than 1%, or 0.5% or less, particularly less than 0.1%. When the viewpoint of increasing the depth of layer is emphasized, a suitable lower limit of the content range of $K_2O$ is 0% or more, 0.1% or more, or 0.3% or more, particularly 0.5% or more.

The molar ratio $[Li_2O]/([Na_2O]+[K_2O])$ is preferably from 0.4 to 1.0, or from 0.5 to 0.9, particularly preferably from 0.6 to 0.8. When the molar ratio $[Li_2O]/([Na_2O]+[K_2O])$ is too low, there is a risk in that the ion exchange performance cannot be sufficiently exhibited. In particular, the efficiency of ion exchange between a Li ion in the glass and a Na ion in the molten salt is liable to be reduced. Meanwhile, when the molar ratio $[Li_2O]/([Na_2O]+[K_2O])$ is too high, a devitrified crystal is liable to precipitate in the glass, and it becomes difficult to form the glass into a sheet shape by an overflow down-draw method or the like. The "$[Li_2O]/([Na_2O]+[K_2O])$" refers to a value obtained by dividing the content of $Li_2O$ by the total content of $Na_2O$ and $K_2O$.

MgO is a component that reduces the viscosity at high temperature to improve the meltability and the formability, and increases the strain point and the Vickers hardness. Among alkaline earth metal oxides, MgO is a component that has a high effect of improving the ion exchange performance. However, when the content of MgO is too large, the devitrification resistance is liable to be reduced, and particularly, it becomes difficult to suppress devitrification caused by a reaction with alumina-based refractory. Accordingly, a suitable content of MgO is from 0% to 10%, from 0% to 5%, from 0.1% to 4%, or from 0.2% to 3.5%, particularly from 0.5% to less than 3%.

ZnO is a component that improves the ion exchange performance, and particularly, is a component that has a high effect of increasing the compressive stress value of the compressive stress layer on the outermost surface. In addition, ZnO is also a component that reduces the viscosity at high temperature without reducing a viscosity at low temperature. A suitable lower limit of the content range of ZnO is 0% or more, 0.1% or more, 0.3% or more, 0.5% or more, or 0.7% or more, particularly 1% or more. Meanwhile, when the content of ZnO is too large, there is a tendency that the glass undergoes phase separation, the devitrification resistance is reduced, the density is increased, or the depth of layer is reduced. Accordingly, a suitable upper limit of the content range of ZnO is 10% or less, 6% or less, 5% or less, 4% or less, 3% or less, 2% or less, 1.5% or less, 1.3% or less, or 1.2% or less, particularly 1.1% or less.

$P_2O_5$ is a component that improves the ion exchange performance, and particularly, is a component that increases the depth of layer. Further, $P_2O_5$ is a component that also improves the acid resistance. When the content of $P_2O_5$ is too small, there is a risk in that the ion exchange performance cannot be sufficiently exhibited. In particular, the efficiency of ion exchange between a Na ion in the glass and a K ion in the molten salt is liable to be reduced, and the depth of layer (DOL_ZERO$_K$) of the compressive stress layer is liable to be reduced. In addition, there is a risk in that the glass may be unstable, and the devitrification resistance may be reduced. Accordingly, a suitable lower limit of the content range of $P_2O_5$ is 0% or more, 0.1% or more, 0.4% or more, 0.7% or more, 1% or more, 1.2% or more, 1.4% or more, 1.6% or more, 2% or more, 2.3% or more, or 2.5% or more, particularly 3% or more. Meanwhile, when the content of $P_2O_5$ is too large, the glass undergoes phase separation, or water resistance is liable to be reduced. In addition, the depth of layer obtained through ion exchange between a Li ion in the glass and a Na ion in the molten salt is excessively increased, with the result that the compressive stress value (CS$_{Na}$) of the compressive stress layer is liable to be reduced. Accordingly, a suitable upper limit of the content range of $P_2O_5$ is 15% or less, 10% or less, 5% or less, 4.5% or less, or 4% or less. When the content of $P_2O_5$ is set to fall within the suitable ranges, a non-monotonic profile becomes easily formable.

An alkali metal oxide is an ion exchange component, and is also a component that reduces the viscosity at high temperature to improve the meltability and the formability. When the content of the alkali metal oxide ([Li$_2$O]+[Na$_2$O]+[K$_2$O]) is too large, there is a risk in that the thermal expansion coefficient may be increased. In addition, there is a risk in that the acid resistance may be reduced. Accordingly, a suitable lower limit of the content range of the alkali metal oxide ([Li$_2$O]+[Na$_2$O]+[K$_2$O]) is 10% or more, 11% or more, 12% or more, 13% or more, 14% or more, or 15% or more. Accordingly, a suitable upper limit of the content range of the alkali metal oxide ([Li$_2$O]+[Na$_2$O]+[K$_2$O]) is 25% or less, 23% or less, 20% or less, 19% or less, or 18% or less.

The molar ratio [Li$_2$O]/[P$_2$O$_5$] is preferably from 4 to 30, or from 10 to 25, particularly preferably from 15 to 20. When the molar ratio [Li$_2$O]/[P$_2$O$_5$] is too low, the efficiency of ion exchange between a Li ion in the glass and a Na ion in the molten salt is liable to be reduced. Meanwhile, when the molar ratio [Li$_2$O]/[P$_2$O$_5$] is too high, a devitrified crystal is liable to precipitate in the glass, and it becomes difficult to form the glass into a sheet shape by an overflow down-draw method or the like. The "[Li$_2$O]/[P$_2$O$_5$]" refers to a value obtained by dividing the content of Li$_2$O by the content of P$_2$O$_5$.

The molar ratio ([Na$_2$O]−[Li$_2$O])/([Al$_2$O$_3$]+[B$_2$O$_3$]+[P$_2$O$_5$]) is preferably 0.29 or less, 0.27 or less, 0.26 or less, 0.25 or less, 0.23 or less, or 0.20 or less, particularly preferably 0.00 or more and 0.15 or less. When the molar ratio ([Na$_2$O]−[Li$_2$O])/([Al$_2$O$_3$]+[B$_2$O$_3$]+[P$_2$O$_5$]) is too high, there is a risk in that the ion exchange performance cannot be sufficiently exhibited. In particular, the efficiency of ion exchange between a Li ion in the glass and a Na ion in the molten salt is liable to be reduced.

The molar ratio ([B$_2$O$_3$]+[Na$_2$O]−[P$_2$O$_5$])/([Al$_2$O$_3$]+[Li$_2$O]) is preferably 0.30 or more, 0.35 or more, 0.40 or more, 0.42 or more, or 0.43 or more, particularly preferably 0.45 or more and 1.24 or less. When the molar ratio ([B$_2$O$_3$]+[Na$_2$O]−[P$_2$O$_5$])/([Al$_2$O$_3$]+[Li$_2$O]) is too low, a devitrified crystal is liable to precipitate in the glass, and it becomes difficult to form the glass into a sheet shape by an overflow down-draw method or the like.

The ([SiO$_2$]+1.2×[P$_2$O$_5$]−3×[Al$_2$O$_3$]−2×[Li$_2$O]−1.5×[Na$_2$O]−[K$_2$O][B$_2$O$_3$]) is preferably −40% or more, −30% or more, −25% or more, −24% or more, −23% or more, −22% or more, −21% or more, −20% or more, or −19% or more, particularly preferably −18% or more. When the ([SiO$_2$]+1.2×[P$_2$O$_5$]−3×[Al$_2$O$_3$]−2×[Li$_2$O]−1.5×[Na$_2$O]−[K$_2$O]−[B$_2$O$_3$]) is too low, the acid resistance is liable to be reduced. Meanwhile, when the ([SiO$_2$]+1.2×[P$_2$O$_5$]−3×[Al$_2$O$_3$]−2×[Li$_2$O]−1.5×[Na$_2$O]−[K$_2$O][B$_2$O$_3$]) is too high, there is a risk in that the ion exchange performance cannot be sufficiently exhibited. Accordingly, the ([SiO$_2$]+1.2×[P$_2$O$_5$]−3×[Al$_2$O$_3$]−2×[Li$_2$O]−1.5×[Na$_2$O]−[K$_2$O][B$_2$O$_3$]) is preferably 30 mol % or less, 20 mol % or less, 15 mol % or less, 10 mol % or less, or 5 mol % or less, particularly preferably 0 mol % or less.

For example, the following components other than the above-mentioned components may be added.

CaO is a component that reduces the viscosity at high temperature to improve the meltability and the formability without reducing the devitrification resistance as compared to other components, and increases the strain point and the Vickers hardness. However, when the content of CaO is too large, there is a risk in that the ion exchange performance may be reduced, or an ion exchange solution may be degraded at the time of ion exchange treatment. Accordingly, a suitable upper limit of the content range of CaO is 6% or less, 5% or less, 4% or less, 3.5% or less, 3% or less, 2% or less, 1% or less, less than 1%, or 0.5% or less, particularly less than 0.1%.

SrO and BaO are each a component that reduces the viscosity at high temperature to improve the meltability and the formability, and increases the strain point and the Young's modulus. However, when the contents of SrO and BaO are too large, an ion exchange reaction is liable to be inhibited. Besides, the density or the thermal expansion coefficient is increased inappropriately, or the glass is liable to denitrify. Accordingly, suitable contents of SrO and BaO are each from 0% to 2%, from 0% to 1.5%, from 0% to 1%, from 0% to 0.5%, or from 0% to 0.1%, particularly from 0% to less than 0.1%.

ZrO$_2$ is a component that increases the Vickers hardness, and is also a component that increases viscosity around the liquidus viscosity and the strain point. However, when the content of ZrO$_2$ is too large, there is a risk in that the devitrification resistance is remarkably reduced. Accordingly, a suitable content of ZrO$_2$ is from 0% to 3%, from 0% to 1.5%, or from 0% to 1%, particularly from 0% to 0.1%.

TiO$_2$ is a component that improves the ion exchange performance, and is also a component that reduces the viscosity at high temperature. However, when the content of TiO$_2$ is too large, transparency and the devitrification resistance are liable to be reduced. Accordingly, a suitable content of TiO$_2$ is from 0% to 3%, from 0% to 1.5%, from 0% to 1%, or from 0% to 0.1%, particularly from 0.001 mol % to 0.1 mol %.

SnO$_2$ is a component that improves the ion exchange performance. However, when the content of SnO$_2$ is too large, the devitrification resistance is liable to be reduced. Accordingly, a suitable lower limit of the content range of SnO$_2$ is 0.005% or more, or 0.01% or more, particularly 0.1% or more, and a suitable upper limit thereof is 3% or less, or 2% or less, particularly 1% or less.

Cl is a fining agent, but is a component that adversely affects an environment or a facility when the content thereof is too large. Accordingly, a suitable lower limit of the content range of Cl is 0.001% or more, particularly 0.01% or more, and a suitable upper limit thereof is 0.3% or less, or 0.2% or less, particularly 0.1% or less.

As a fining agent, one kind or two or more kinds selected from the group consisting of $SO_3$ and $CeO_2$ (preferably the group consisting of $SO_3$) may be added at from 0.001% to 1%.

$Fe_2O_3$ is an impurity that is inevitably mixed in from raw materials. A suitable content of $Fe_2O_3$ is less than 1,000 ppm (less than 0.1%), less than 800 ppm, less than 600 ppm, or less than 400 ppm, particularly less than 300 ppm. When the content of $Fe_2O_3$ is too large, the transmittance of a cover glass is liable to be reduced.

Meanwhile, the lower limit of the content range of $Fe_2O_3$ is 10 ppm or more, 20 ppm or more, 30 ppm or more, 50 ppm or more, 80 ppm or more, or 100 ppm or more. When the content of $Fe_2O_3$ is too small, a raw material cost rises owing to the use of high-purity raw materials, and a product cannot be manufactured inexpensively.

A rare earth oxide, such as $Nd_2O_3$, $La_2O_3$, $Y_2O_3$, $Nb_2O_5$, $Ta_2O_5$, or $Hf_2O_3$, is a component that increases the Young's modulus. However, the costs of raw materials therefor are high. In addition, when the rare earth oxide is added in a large amount, the devitrification resistance is liable to be reduced. Accordingly, a suitable content of the rare earth oxide is 5% or less, 3% or less, 2% or less, 1% or less, or 0.5% or less, particularly 0.1% or less.

It is preferred that the tempered glass sheet (glass sheet to be tempered) of the present invention be substantially free of $As_2O_3$, $Sb_2O_3$, PbO, and F as a glass composition from the standpoint of environmental considerations. In addition, it is also preferred that the tempered glass sheet (glass sheet to be tempered) be substantially free of $Bi_2O_3$ from the standpoint of environmental considerations. The "substantially free of" has a concept in which the explicit component is not positively added as a glass component, but its addition at an impurity level is permitted, and specifically refers to the case in which the content of the explicit component is less than 0.05%.

The tempered glass sheet (glass sheet to be tempered) of the present invention preferably has the following characteristics.

A density is preferably 2.55 g/cm³ or less, 2.53 g/cm³ or less, 2.50 g/cm³ or less, 2.49 g/cm³ or less, or 2.45 g/cm³ or less, particularly preferably from 2.35 g/cm³ to 2.44 g/cm³. As the density becomes lower, the weight of the tempered glass sheet can be reduced more.

A thermal expansion coefficient at from 30° C. to 380° C. is preferably $150 \times 10^{-7}$/° C. or less, or $100 \times 10^{-7}$/° C. or less, particularly preferably from $50 \times 10^{-7}$/° C. to $95 \times 10^{-7}$/° C. The "thermal expansion coefficient at from 30° C. to 380° C." refers to a value for an average thermal expansion coefficient measured with a dilatometer.

A softening point is preferably 950° C. or less, 930° C. or less, 900° C. or less, 880° C. or less, or 860° C. or less, particularly preferably from 850° C. to 700° C. The "softening point" refers to a value measured based on a method of ASTM C338.

A temperature at a viscosity at high temperature of $10^{2.5}$ dPa·s is preferably 1,660° C. or less, less than 1,620° C., or 1,600° C. or less, particularly preferably from 1,400° C. to 1,590° C. When the temperature at a viscosity at high temperature of $10^{2.5}$ dPa·s is too high, the meltability and the formability are reduced, with the result that it becomes difficult to form molten glass into a sheet shape. The "temperature at a viscosity at high temperature of $10^{2.5}$ dPa·s" refers to a value measured by a platinum sphere pull up method.

A liquidus viscosity is preferably $10^{3.74}$ dPa·s or more, $10^{4.5}$ dPa·s or more, $10^{4.8}$ dPa·s or more, $10^{4.9}$ dPa·s or more, $10^{5.0}$ dPa·s or more, $10^{5.1}$ dPa·s or more, $10^{5.2}$ dPa·s or more, $10^{5.3}$ dPa·s or more, or $10^{5.4}$ dPa·s or more, particularly preferably $10^{5.5}$ dPa·s or more. As the liquidus viscosity becomes higher, devitrification resistance is improved more, and devitrified stones are less liable to be generated at the time of forming. The "liquidus viscosity" as used herein refers to a value for a viscosity at a liquidus temperature measured by a platinum sphere pull up method. The "liquidus temperature" refers to a temperature obtained as described below. Glass powder which has passed through a standard 30-mesh sieve (500 μm) and remained on a 50-mesh sieve (300 μm) is loaded into a platinum boat, and the platinum boat is kept for 24 hours in a temperature gradient furnace and is then taken out of the furnace. At this time, a highest temperature at which devitrification (devitrified stones) is observed with a microscope in glass is measured.

A Young's modulus is preferably 70 GPa or more, 74 GPa or more, or from 75 GPa to 100 GPa, particularly preferably from 76 GPa to 90 GPa. When the Young's modulus is small, the cover glass is liable to be deflected in the case of having a small thickness. The "Young's modulus" may be calculated by a well-known resonance method.

The tempered glass sheet of the present invention has a compressive stress layer in a surface thereof. The compressive stress value of the compressive stress layer on the outermost surface is preferably 165 MPa or more, 200 MPa or more, 220 MPa or more, 250 MPa or more, 280 MPa or more, 300 MPa or more, or 310 MPa or more, particularly preferably 320 MPa or more. When the compressive stress value of the compressive stress layer on the outermost surface becomes higher, the Vickers hardness is increased more. Meanwhile, when an excessively large compressive stress is formed in the surface, an internal tensile stress of the tempered glass is increased excessively, and there is a risk in that a dimensional change before and after ion exchange treatment may be increased. Accordingly, the compressive stress value of the compressive stress layer on the outermost surface is preferably 1,000 MPa or less, 900 MPa or less, 700 MPa or less, 680 MPa or less, or 650 MPa or less, particularly preferably 600 MPa or less. There is a tendency that the compressive stress value of the compressive stress layer on the outermost surface is increased when an ion exchange time period is shortened, or the temperature of an ion exchange solution is reduced.

The depth of layer is preferably 50 μm or more, 60 μm or more, 80 μm or more, or 100 μm or more, particularly preferably 120 μm or more. As the depth of layer becomes larger, protrusions or sand grains on a road surface are less liable to reach a tensile stress layer at the time of dropping of a smartphone, and thus the breakage probability of the cover glass can be reduced more. Meanwhile, when the depth of layer is too large, there is a risk in that a dimensional change before and after the ion exchange treatment may be increased. Further, there is a tendency that the compressive stress value of the compressive stress layer on the outermost surface is reduced. Accordingly, the depth of layer is preferably 200 μm or less, 180 μm or less, or 150 μm or less, particularly preferably 140 μm or less. There is a tendency that the depth of layer is increased when the ion exchange time period is prolonged, or the temperature of the ion exchange solution is increased.

The tempered glass sheet of the present invention has a thickness of preferably 2.0 mm or less, 1.5 mm or less, 1.3 mm or less, 1.1 mm or less, 1.0 mm or less, or 0.9 mm or less, particularly preferably 0.8 mm or less. As the thickness becomes smaller, the mass of the tempered glass sheet can be reduced more. Meanwhile, when the thickness is too small, it becomes difficult to obtain desired mechanical strength. Accordingly, the thickness is preferably 0.3 mm or more, 0.4 mm or more, 0.5 mm or more, or 0.6 mm or more, particularly preferably 0.7 mm or more.

A method of manufacturing a tempered glass sheet of the present invention comprises: a preparation step of preparing a glass sheet to be tempered including as a glass composition, in terms of mol %, 50% to 80% of $SiO_2$, 8% to 25% of $Al_2O_3$, 0% to 10% of $B_2O_3$, 3% to 15% of $Li_2O$, 3% to 21% of $Na_2O$, 0% to 10% of $K_2O$, 0% to 10% of MgO, 0% to 10% of ZnO, and 0% to 15% of $P_2O_5$; and an ion exchange step of subjecting the glass sheet to be tempered to ion exchange treatment a plurality of times, to thereby obtain a tempered glass sheet having a compressive stress layer in a surface thereof. The method of manufacturing a tempered glass sheet of the present invention has a feature of performing the ion exchange treatment a plurality of times, but the tempered glass sheet of the present invention encompasses not only the case of performing the ion exchange treatment a plurality of times, but also the case of performing the ion exchange treatment only once.

A method of manufacturing the glass to be tempered is, for example, as described below. As a preferred method, first, glass raw materials blended so as to give a desired glass composition are loaded into a continuous melting furnace, heated to be melted at 1,400° C. to 1,700° C., and fined. After that, the molten glass is supplied to a forming apparatus and formed into a sheet shape, followed by cooling. As a method of cut processing, into predetermined dimensions, the glass having been formed into a sheet shape, a well-known method may be adopted.

As a method of forming the molten glass into a sheet shape, an overflow down-draw method is preferred. In the overflow down-draw method, a surface to serve as the surface of the glass sheet is not brought into contact with the surface of the forming body refractory, and is formed into a sheet shape in a state of a free surface. Thus, a glass sheet having satisfactory surface quality can be manufactured inexpensively without polishing. Further, in the overflow down-draw method, alumina-based refractory or zirconia-based refractory is used as the forming body refractory. Moreover, the tempered glass sheet of the present invention (glass sheet to be tempered) has good compatibility with the alumina-based refractory or the zirconia-based refractory (particularly the alumina-based refractory), and hence has a property of hardly generating bubbles, stones, or the like through a reaction with the refractory.

Various forming methods other than the overflow down-draw method may also be adopted. For example, forming methods such as a float method, a down-draw method (such as a slot down-draw method or a re-draw method), a roll out method, and a press method may be adopted.

At the time of forming of the molten glass, the molten glass is preferably cooled in a temperature region of from the annealing point of the molten glass to the strain point of the molten glass at a cooling rate of 3° C./min or more and less than 1,000° C./min. The lower limit of the range of the cooling rate is preferably 10° C./min or more, 20° C./min or more, or 30° C./min or more, particularly preferably 50° C./min or more, and the upper limit thereof is preferably less than 1,000° C./min, or less than 500° C./min, particularly preferably less than 300° C./min. When the cooling rate is too high, the structure of the glass becomes rough, and it becomes difficult to increase the Vickers hardness after the ion exchange treatment. Meanwhile, when the cooling rate is too low, the manufacturing efficiency of the glass sheet is reduced.

In the method of manufacturing a tempered glass sheet of the present invention, the ion exchange treatment is performed a plurality of times. As the ion exchange treatment performed a plurality of times, it is preferred to perform ion exchange treatment in which the glass sheet to be tempered is immersed in a molten salt containing a $KNO_3$ molten salt, and then perform ion exchange treatment in which the glass sheet to be tempered is immersed in a molten salt containing a $NaNO_3$ molten salt. With this configuration, while a large depth of layer is ensured, the compressive stress value of the compressive stress layer on the outermost surface can be increased.

Figure 2:
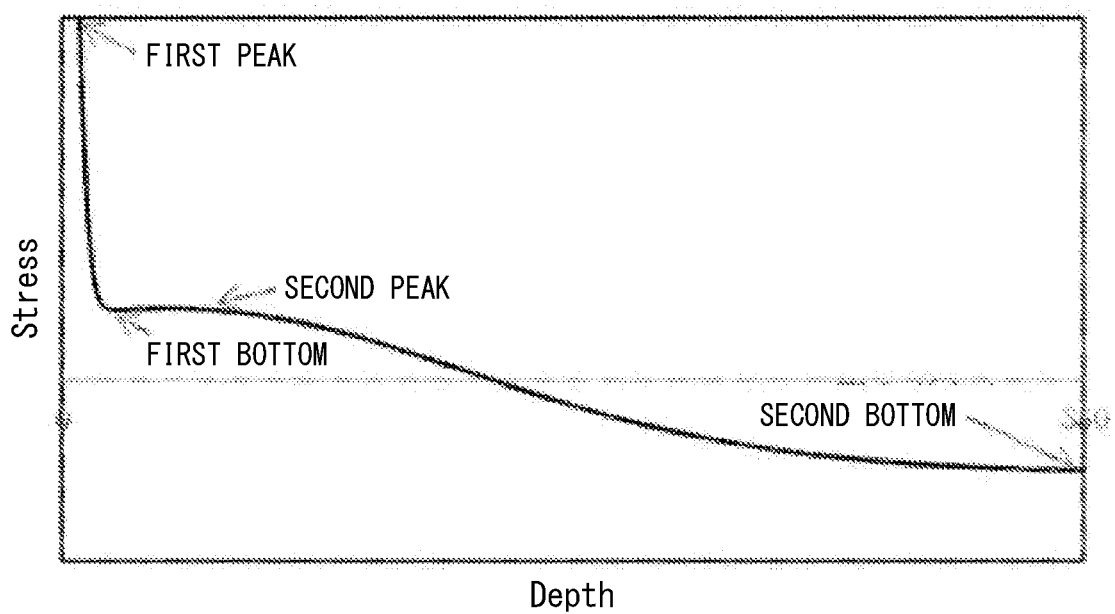
FIG. 2 is another explanatory view for illustrating an example of a stress profile having a first peak, a second peak, a first bottom, and a second bottom.

In particular, in the method of manufacturing a tempered glass sheet of the present invention, it is preferred to perform ion exchange treatment (first ion exchange step) in which the glass sheet to be tempered is immersed in a $NaNO_3$ molten salt or a mixed molten salt of $NaNO_3$ and $KNO_3$, and then perform ion exchange treatment (second ion exchange step) in which the glass sheet to be tempered is immersed in a mixed molten salt of $KNO_3$ and $LiNO_3$. With this configuration, a non-monotonic stress profile illustrated in each of FIG. 1 and FIG. 2, that is, a stress profile having at least a first peak, a second peak, a first bottom, and a second bottom can be formed. As a result, the breakage probability of the cover glass can be significantly reduced at the time of dropping of a smartphone.

In the first ion exchange step, a Li ion in the glass and a Na ion in the molten salt are ion exchanged with each other, and in the case of using the mixed molten salt of $NaNO_3$ and $KNO_3$, a Na ion in the glass and a K ion in the molten salt are further ion exchanged with each other. Herein, the ion exchange between a Li ion in the glass and a Na ion in the molten salt is faster and more efficient than the ion exchange between a Na ion in the glass and a K ion in the molten salt. In the second ion exchange step, a Na ion in the vicinity of the glass surface (a shallow region from the outermost surface to a sheet thickness of 20%) and a Li ion in the molten salt are ion exchanged with each other, and besides, a Na ion in the vicinity of the glass surface (the shallow region from the outermost surface to a sheet thickness of 20%) and a K ion in the molten salt are ion exchanged with each other. That is, in the second ion exchange step, while a Na ion in the vicinity of the glass surface is released, a K ion, which has a large ionic radius, can be introduced. As a result, while a large depth of layer is maintained, the compressive stress value of the compressive stress layer on the outermost surface can be increased.

In the first ion exchange step, the temperature of the molten salt is preferably from 360° C. to 400° C., and the ion exchange time period is preferably from 30 minutes to 6 hours. In the second ion exchange step, the temperature of the ion exchange solution is preferably from 370° C. to 400° C., and the ion exchange time period is preferably from 15 minutes to 3 hours.

In order to form the non-monotonic stress profile, it is preferred that the concentration of $NaNO_3$ be higher than the concentration of $KNO_3$ in the mixed molten salt of $NaNO_3$ and $KNO_3$ to be used in the first ion exchange step, and that the concentration of $KNO_3$ be higher than the concentration of LiNO₃ in the mixed molten salt of KNO₃ and LiNO₃ to be used in the second ion exchange step.

In the mixed molten salt of NaNO₃ and KNO₃ to be used in the first ion exchange step, the concentration of KNO₃ is preferably 0 mass % or more, 0.5 mass % or more, 1 mass % or more, 5 mass % or more, 7 mass % or more, 10 mass % or more, or 15 mass % or more, particularly preferably from 20 mass % to 90 mass %. When the concentration of KNO₃ is too high, there is a risk in that the compressive stress value obtained through ion exchange between a Li ion in the glass and a Na ion in the molten salt may be excessively reduced. In addition, when the concentration of KNO₃ is too low, there is a risk in that measurement of a stress with a surface stress meter FSM-6000 may become difficult.

In the mixed molten salt of KNO₃ and LiNO₃ to be used in the second ion exchange step, the concentration of LiNO₃ is preferably from more than 0 mass % to 5 mass %, from more than 0 mass % to 3 mass %, or from more than 0 mass % to 2 mass %, particularly preferably from 0.1 mass % to 1 mass %. When the concentration of LiNO₃ is too low, it becomes difficult to release a Na ion in the vicinity of the glass surface. Meanwhile, when the concentration of LiNO₃ is too high, there is a risk in that the compressive stress value obtained through ion exchange between a Na ion in the vicinity of the glass surface and a K ion in the molten salt may be excessively reduced.

Example 1

The present invention is hereinafter described with reference to Examples. The following Examples are merely illustrative. The present invention is by no means limited to the following Examples.

The glass compositions and glass characteristics of Examples (Sample Nos. 1 to 35 and 38 to 215) of the present invention and Comparative Examples (Sample Nos. 36 and 37) are shown in Tables to 22. In the tables, the "N.A." means "unmeasured", the "(Na–Li)/(Al+B+P)" means the molar ratio ($[Na_2O]-[Li_2O])/([Al_2O_3]+[B_2O_3]+[P_2O_5]$), the "(B+Na–P)/(Al+Li)" means the molar ratio ($[B_2O_3]+[Na_2O]-[P_2O_5])/([Al_2O_3]+[Li_2O]$), and the "Si+1.2P−3Al−2Li−1.5Na−K−B" means the $[SiO_2]+1.2\times[P_2O_5]-3\times[Al_2O_3]-2\times[Li_2O]-1.5\times[Na_2O]-[K_2O]-[B_2O_3]$.

TABLE 1

| (mol %) | No. 1 | No. 2 | No. 3 | No. 4 | No. 5 | No. 6 | No. 7 | No. 8 | No. 9 | No. 10 |
|---|---|---|---|---|---|---|---|---|---|---|
| SiO₂ | 59.07 | 59.07 | 60.07 | 60.07 | 61.07 | 61.07 | 61.07 | 61.07 | 61.07 | 61.07 |
| Al₂O₃ | 17.81 | 15.81 | 17.81 | 15.81 | 18.81 | 17.81 | 16.81 | 16.81 | 15.81 | 15.81 |
| B₂O₃ | 0.00 | 0.00 | 0.00 | 0.00 | 0.00 | 0.00 | 0.00 | 0.00 | 0.00 | 0.00 |
| Li₂O | 8.34 | 8.34 | 8.34 | 8.34 | 7.34 | 7.34 | 8.34 | 7.34 | 7.34 | 8.34 |
| Na₂O | 11.10 | 13.10 | 10.10 | 12.10 | 9.10 | 10.10 | 10.10 | 11.10 | 12.10 | 11.10 |
| K₂O | 0.00 | 0.00 | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 | 0.00 | 0.00 |
| ZnO | 1.16 | 1.16 | 1.16 | 1.16 | 1.16 | 1.16 | 1.16 | 1.16 | 1.16 | 1.16 |
| P₂O₅ | 2.47 | 2.47 | 2.47 | 2.47 | 2.47 | 2.47 | 2.47 | 2.47 | 2.47 | 2.47 |
| SnO₂ | 0.04 | 0.04 | 0.04 | 0.04 | 0.04 | 0.04 | 0.04 | 0.04 | 0.04 | 0.04 |
| (Na—Li)/(Al + B + P) | 0.136 | 0.260 | 0.087 | 0.205 | 0.083 | 0.136 | 0.091 | 0.195 | 0.260 | 0.151 |
| (B + Na—P)/(Al + Li) | 0.330 | 0.440 | 0.292 | 0.399 | 0.253 | 0.303 | 0.303 | 0.357 | 0.416 | 0.357 |
| Si + 1.2P—3Al—2Li—1.5Na—K—B | −24.72 | −21.72 | −22.22 | −19.22 | −20.72 | −19.22 | −18.22 | −17.72 | −16.22 | −16.72 |
| ρ (g/cm³) | 2.452 | 2.459 | 2.445 | 2.451 | 2.438 | 2.440 | 2.441 | 2.444 | 2.447 | 2.443 |
| α₃₀₋₃₈₀° C. (×10⁻⁷/° C.) | 87 | 95 | 84 | 91 | 75 | 83 | 81 | 85 | 89 | 88 |
| Ts (° C.) | 856 | N.A. | N.A. | N.A. | 915 | 889 | 874 | 867 | 861 | 844 |
| 10²·⁵ dPa · s (° C.) | 1,518 | 1,475 | 1,535 | 1,504 | 1,561 | 1,560 | 1,547 | 1,552 | 1,535 | 1,524 |
| TL (° C.) | 1,049 | 916 | 1,088 | 973 | 1,125 | 1,078 | 1,085 | 1,035 | 976 | 1,056> |
| logη at TL (dPa · s) | 5.3 | 6.4 | 3.9 | 5.9 | 5.2 | 5.4 | 5.2 | 5.6 | 6.1 | 5.2< |
| E (GPa) | N.A. | N.A. | N.A. | N.A. | N.A. | N.A. | N.A. | N.A. | N.A. | N.A. |
| CS_K (MPa) | 1,248 | 1,129 | 1,292 | 1,142 | 1,389 | 1,309 | 1,248 | 1,264 | 1,198 | 1,152 |
| DOL_ZERO_K (μm) | 20 | 24 | 19 | 24 | 16 | 19 | 19 | 21 | 24 | 22 |
| CS_Na (MPa) | 287 | 201 | 312 | 208 | 279 | 269 | 269 | 248 | 211 | 236 |
| DOL_ZERO_Na (μm) | 125 | 121 | 126 | 123 | 134 | 123 | 123 | 128 | 126 | 143 |

TABLE 2

| (mol %) | No. 11 | No. 12 | No. 13 | No. 14 | No. 15 | No. 16 | No. 17 | No. 18 | No. 19 | No. 20 |
|---|---|---|---|---|---|---|---|---|---|---|
| SiO₂ | 61.07 | 63.07 | 61.07 | 63.07 | 63.07 | 61.07 | 61.07 | 61.07 | 59.07 | 59.07 |
| Al₂O₃ | 17.81 | 15.81 | 17.81 | 15.81 | 17.81 | 15.81 | 15.81 | 17.81 | 17.81 | 15.81 |
| B₂O₃ | 0.00 | 0.00 | 0.00 | 0.00 | 0.00 | 0.00 | 0.00 | 0.00 | 2.00 | 2.00 |
| Li₂O | 8.34 | 8.34 | 8.34 | 7.34 | 8.34 | 7.34 | 8.34 | 8.34 | 8.34 | 8.34 |
| Na₂O | 9.10 | 11.10 | 11.10 | 12.10 | 9.10 | 12.10 | 11.10 | 9.10 | 11.10 | 13.10 |
| K₂O | 0.00 | 0.00 | 0.00 | 0.00 | 0.00 | 0.00 | 0.00 | 0.00 | 0.00 | 0.00 |
| MgO | 0.00 | 0.00 | 0.00 | 0.00 | 0.00 | 2.00 | 2.00 | 2.00 | 0.00 | 0.00 |
| ZnO | 1.16 | 1.16 | 1.16 | 1.16 | 1.16 | 1.16 | 1.16 | 1.16 | 1.16 | 1.16 |
| P₂O₅ | 2.47 | 0.47 | 0.47 | 0.47 | 0.47 | 0.47 | 0.47 | 0.47 | 0.47 | 0.47 |
| SnO₂ | 0.04 | 0.04 | 0.04 | 0.04 | 0.04 | 0.04 | 0.04 | 0.04 | 0.04 | 0.04 |
| (Na—Li)/(Al + B + P) | 0.037 | 0.169 | 0.151 | 0.292 | 0.041 | 0.292 | 0.169 | 0.041 | 0.136 | 0.260 |
| (B + Na—P)/(Al + Li) | 0.253 | 0.440 | 0.406 | 0.502 | 0.330 | 0.502 | 0.440 | 0.330 | 0.483 | 0.606 |
| Si + 1.2P—3Al—2Li—1.5Na—K—B | −19.72 | −17.12 | −25.12 | −16.62 | −20.12 | −18.62 | −19.12 | −22.12 | −29.12 | −26.12 |
| ρ (g/cm³) | 2.437 | 2.454 | 2.460 | 2.457 | 2.446 | 2.471 | 2.469 | 2.463 | 2.450 | 2.462 |
| α₃₀₋₃₈₀° C. (×10⁻⁷/° C.) | 78 | 87 | 87 | 89 | 79 | 89 | 88 | 78 | 86 | 92 |
| Ts (° C.) | N.A. | N.A. | N.A. | 823 | N.A. | 806 | N.A. | N.A. | 816 | 743 |

TABLE 2-continued

| (mol %) | No. 11 | No. 12 | No. 13 | No. 14 | No. 15 | No. 16 | No. 17 | No. 18 | No. 19 | No. 20 |
|---|---|---|---|---|---|---|---|---|---|---|
| $10^{2.5}$ dPa · s (° C.) | 1,550 | 1,527 | 1,528 | 1,535 | 1,558 | 1,489 | 1,480 | 1,507 | 1,487 | 1,449 |
| TL (° C.) | 1,125 | 1,032 | 1,070 | 984 | 1,134 | 957 | 1,018 | 1,230 | 1,055 | 904 |
| log η at TL (dPa · s) | 4.9 | 5.1 | 5.1 | 5.7 | 4.9 | 5.7 | 5 | 3.9 | 5 | 5.6 |
| E (GPa) | N.A. | 80 | 80 | N.A. | N.A. | N.A. | N.A. | N.A. | 78 | 78 |
| $CS_K$ (MPa) | 1,326 | 967 | 1,165 | 1,083 | 1,449 | 1,170 | 1,149 | 1,460 | 1,228 | 932 |
| DOL_ZERO$_K$ (μm) | 18 | 18 | 17 | 17 | 16 | 14 | 12 | 10 | 14 | 14 |
| $CS_{Na}$ (MPa) | 299 | 278 | 305 | 236 | 304 | 224 | 262 | 309 | 321 | 298 |
| DOL_ZERO$_{Na}$ (μm) | 136 | 116 | 119 | 119 | 137 | 98 | 104 | 104 | 104 | 93 |

TABLE 3

| (mol %) | No. 21 | No. 22 | No. 23 | No. 24 | No. 25 | No. 26 | No. 27 | No. 28 | No. 29 | No. 30 |
|---|---|---|---|---|---|---|---|---|---|---|
| $SiO_2$ | 60.07 | 60.07 | 61.07 | 61.07 | 61.07 | 61.07 | 59.07 | 59.07 | 59.07 | 59.07 |
| $Al_2O_3$ | 17.81 | 15.81 | 18.81 | 17.81 | 16.81 | 16.81 | 17.81 | 16.81 | 18.81 | 18.81 |
| $B_2O_3$ | 2.00 | 2.00 | 2.00 | 2.00 | 2.00 | 2.00 | 2.00 | 2.00 | 2.00 | 2.00 |
| $Li_2O$ | 8.34 | 8.34 | 7.34 | 7.34 | 8.34 | 7.34 | 7.34 | 8.34 | 8.34 | 7.34 |
| $Na_2O$ | 10.10 | 12.10 | 9.10 | 10.10 | 10.10 | 11.10 | 12.10 | 12.10 | 10.10 | 11.10 |
| $K_2O$ | 0.00 | 0.00 | 0.00 | 0.00 | 0.00 | 0.00 | 0.00 | 0.00 | 0.00 | 0.00 |
| MgO | 0.00 | 0.00 | 0.00 | 0.00 | 0.00 | 0.00 | 0.00 | 0.00 | 0.00 | 0.00 |
| ZnO | 1.16 | 1.16 | 1.16 | 1.16 | 1.16 | 1.16 | 1.16 | 1.16 | 1.16 | 1.16 |
| $P_2O_5$ | 0.47 | 0.47 | 0.47 | 0.47 | 0.47 | 0.47 | 0.47 | 0.47 | 0.47 | 0.47 |
| $SnO_2$ | 0.04 | 0.04 | 0.04 | 0.04 | 0.04 | 0.04 | 0.04 | 0.04 | 0.04 | 0.04 |
| (Na—Li)/(Al + B + P) | 0.087 | 0.205 | 0.083 | 0.136 | 0.091 | 0.195 | 0.235 | 0.195 | 0.083 | 0.177 |
| (B + Na—P)/(Al + Li) | 0.445 | 0.564 | 0.406 | 0.462 | 0.462 | 0.523 | 0.542 | 0.542 | 0.428 | 0.483 |
| Si + 1.2P—3Al—2Li—1.5Na—K—B | −26.62 | −23.62 | −25.12 | −23.62 | −22.62 | −22.12 | −28.62 | −27.62 | −30.62 | −30.12 |
| ρ (g/cm$^3$) | 2.442 | 2.455 | 2.438 | 2.438 | 2.440 | 2.443 | 2.452 | 2.456 | 2.450 | 2.450 |
| $\alpha_{30\text{-}380° C.}$ (×10$^{-7}$/° C.) | 82 | 89 | 74 | 80 | 83 | 84 | 88 | 90 | 82 | 83 |
| Ts (° C.) | N.A. | 756 | 882 | 862 | 827 | 821 | 819 | 777 | 850 | 856 |
| $10^{2.5}$ dPa · s (° C.) | 1,496 | 1,488 | 1,530 | 1,530 | 1,508 | 1,524 | 1,509 | 1,474 | 1,493 | 1,507 |
| TL (° C.) | 1,089 | 967 | 1,060 | 1,078 | 1,091 | 1,030 | 991 | 985 | 1,051 | 1,040 |
| log η at TL (dPa · s) | 4.9 | 5.3 | 5.5 | 5.2 | 4.8 | 5.3 | 5.6 | 5.3 | 5.2 | 5.4 |
| E (GPa) | N.A. | N.A. | N.A. | N.A. | N.A. | N.A. | 76 | 78 | N.A. | N.A. |
| $CS_K$ (MPa) | 1,293 | 860 | 1,438 | 1,385 | 1,218 | 1,230 | 1,264 | 1,087 | 1,439 | 1,433 |
| DOL_ZERO$_K$ (μm) | 14 | 13 | 12 | 15 | 13 | 15 | 14 | 14 | 12 | 14 |
| $CS_{Na}$ (MPa) | 302 | 259 | 297 | 312 | 324 | 271 | 282 | 292 | 309 | 280 |
| DOL_ZERO$_{Na}$ (μm) | 107 | 100 | 111 | 119 | 108 | 111 | 106 | 92 | 112 | 118 |

TABLE 4

| (mol %) | No. 31 | No. 32 | No. 33 | No. 34 | No. 35 | No. 36 | No. 37 |
|---|---|---|---|---|---|---|---|
| $SiO_2$ | 59.07 | 61.07 | 61.07 | 61.07 | 63.58 | 61.07 | 61.07 |
| $Al_2O_3$ | 17.81 | 15.81 | 15.81 | 17.81 | 16.55 | 17.81 | 19.81 |
| $B_2O_3$ | 2.00 | 2.00 | 2.00 | 2.00 | 0.00 | 2.00 | 0.00 |
| $Li_2O$ | 9.34 | 7.34 | 8.34 | 8.34 | 8.19 | 4.34 | 8.34 |
| $Na_2O$ | 10.10 | 12.10 | 11.10 | 9.10 | 8.09 | 13.10 | 7.10 |
| $K_2O$ | 0.00 | 0.00 | 0.00 | 0.00 | 0.52 | 0.00 | 0.00 |
| MgO | 0.00 | 0.00 | 0.00 | 0.00 | 0.33 | 0.00 | 0.00 |
| ZnO | 1.16 | 1.16 | 1.16 | 1.16 | 0.00 | 1.16 | 1.16 |
| $P_2O_5$ | 0.47 | 0.47 | 0.47 | 0.47 | 2.70 | 0.47 | 2.47 |
| $SnO_2$ | 0.04 | 0.04 | 0.04 | 0.04 | 0.04 | 0.04 | 0.04 |
| (Na—Li)/(Al + B + P) | 0.037 | 0.260 | 0.151 | 0.037 | −0.056 | 0.432 | −0.056 |
| (B + Na—P)/(Al + Li) | 0.428 | 0.589 | 0.523 | 0.406 | 0.164 | 0.660 | 0.164 |
| Si + 1.2P—3Al—2Li—1.5Na—K—B | −29.62 | −20.62 | −21.12 | −24.12 | −11.87 | −22.12 | −22.72 |
| ρ (g/cm$^3$) | 2.450 | 2.449 | 2.448 | 2.435 | 2.404 | 2.442 | 2.437 |
| $\alpha_{30\text{-}380° C.}$ (×10$^{-7}$/° C.) | 84 | 87 | 86 | 78 | 79 | 83 | 68 |
| Ts (° C.) | N.A. | 785 | 781 | N.A. | N.A. | 891 | 917 |
| $10^{2.5}$ dPa · s (° C.) | 1,480 | 1,508 | 1,487 | 1,519 | 1,593 | 1,564 | 1,541 |
| TL (° C.) | 1,068 | 938> | 1,034 | 1,117 | 1,145 | 938> | 1,343< |
| log η at TL (dPa · s) | 4.8 | 5.8< | 4.9 | 4.9 | 5.14 | 7.0< | 3.5> |
| E (GPa) | N.A. | N.A. | N.A. | N.A. | 77 | N.A. | N.A. |
| $CS_K$ (MPa) | 1,225 | 1,045 | 1,026 | 1,379 | 1,021 | 1,474 | 1,376 |
| DOL_ZERO$_K$ (μm) | 12 | 15 | 13 | 14 | 26 | 21 | 11 |
| $CS_{Na}$ (MPa) | 340 | 255 | 280 | 330 | 310 | 163 | 324 |
| DOL_ZERO$_{Na}$ (μm) | 112 | 105 | 105 | 115 | 131 | 132 | 116 |

TABLE 5

| (mol %) | No. 38 | No. 39 | No. 40 | No. 41 | No. 42 | No. 43 | No. 44 | No. 45 | No. 46 | No. 47 | No. 48 |
|---|---|---|---|---|---|---|---|---|---|---|---|
| $SiO_2$ | 62.24 | 62.24 | 60.24 | 60.24 | 62.24 | 62.24 | 60.24 | 60.24 | 58.24 | 56.24 | 58.24 |
| $Al_2O_3$ | 17.81 | 15.81 | 17.81 | 15.81 | 17.81 | 15.81 | 17.81 | 15.81 | 17.81 | 17.81 | 17.81 |
| $B_2O_3$ | 2.00 | 2.00 | 2.00 | 2.00 | 0.00 | 0.00 | 0.00 | 0.00 | 2.00 | 2.00 | 0.00 |
| $Li_2O$ | 8.34 | 8.34 | 8.34 | 8.34 | 8.34 | 8.34 | 8.34 | 8.34 | 8.34 | 8.34 | 8.34 |
| $Na_2O$ | 9.10 | 11.10 | 11.10 | 13.10 | 9.10 | 11.10 | 11.10 | 13.10 | 9.10 | 11.10 | 9.10 |
| $K_2O$ | 0.00 | 0.00 | 0.00 | 0.00 | 0.00 | 0.00 | 0.00 | 0.00 | 4.00 | 4.00 | 4.00 |
| MgO | 0.00 | 0.00 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 | 0.00 |
| $P_2O_5$ | 0.47 | 0.47 | 0.47 | 0.47 | 2.47 | 2.47 | 2.47 | 2.47 | 0.47 | 0.47 | 2.47 |
| $SnO_2$ | 0.04 | 0.04 | 0.04 | 0.04 | 0.04 | 0.04 | 0.04 | 0.04 | 0.04 | 0.04 | 0.04 |
| $Fe_2O_3$ | 0.01 | 0.01 | 0.01 | 0.01 | 0.01 | 0.01 | 0.01 | 0.01 | 0.01 | 0.01 | 0.01 |
| $TiO_2$ | 0.01 | 0.01 | 0.01 | 0.01 | 0.01 | 0.01 | 0.01 | 0.01 | 0.01 | 0.01 | 0.01 |
| Cl | 0.01 | 0.01 | 0.01 | 0.01 | 0.01 | 0.01 | 0.01 | 0.01 | 0.01 | 0.01 | 0.01 |
| (Na—Li)/(Al + B + P) | 0.04 | 0.15 | 0.14 | 0.26 | 0.04 | 0.15 | 0.14 | 0.26 | 0.04 | 0.14 | 0.04 |
| (B + Na—P)/(Al + Li) | 0.41 | 0.52 | 0.48 | 0.61 | 0.25 | 0.36 | 0.33 | 0.44 | 0.41 | 0.48 | 0.25 |
| Si + 1.2P—3Al—2Li—1.5Na—K—B | −22.96 | −19.96 | −27.96 | −24.96 | −18.56 | −15.56 | −23.56 | −20.56 | −30.96 | −35.96 | −26.56 |
| ρ (g/cm³) | 2.4099 | 2.4257 | 2.4265 | 2.4415 | 2.4127 | 2.4219 | 2.4277 | 2.436 | 2.4418 | 2.4581 | 2.4416 |
| $α_{30-380°C.}$ (×10⁻⁷/°C.) | 80.3 | 86.9 | 86.9 | 91.8 | 80.8 | 88.6 | 88.7 | 94.8 | 96.9 | 103.9 | 99.8 |
| Ts (° C.) | 877 | 775 | 827 | 738 | 917 | N.A. | 877 | N.A. | 773 | N.A. | N.A. |
| $10^{2.5}$ dPa·s (° C.) | 1,538 | 1,517 | 1,516 | 1,467 | 1,580 | 1,548 | 1,546 | 1,498 | 1,492 | 1,461 | 1,537 |
| TL (° C.) | 1,152 | 1,047 | 1,030 | 914 | 1,126 | 1,029 | 1,125 | 1,066 | 1,216 | 941 | 1,120 |
| logη at TL (dPa·s) | 4.66 | 4.87 | 5.33 | 5.55 | 5.19 | 5.62 | 4.87 | 4.90 | 3.74 | 5.25 | 4.78< |
| Acid resistance (HCl 5 wt % 80° C. 24 h) | 34.8< | N.A. | 34.8< | N.A. | 34.8 | 28.5 | 34.8< | 34.8< | N.A. | N.A. | 34.8< |
| Alkali resistance (NaOH 5 wt % 80° C. 6 h) | 0.8 | N.A. | 0.8 | N.A. | 0.9 | 0.8 | 0.9 | 0.7 | N.A. | N.A. | 0.9 |
| E (GPa) | 77.6 | 78.3 | 78.0 | 78.5 | 77.9 | 76.9 | 77.3 | 76.9 | 77.8 | 78.8 | 77.1 |
| $CS_K$ (MPa) | 1,307 | 932 | 1,124 | 751 | 1,262 | 1,016 | 1,151 | 1,018 | 810 | N.A. | 889 |
| $DOL\_ZERO_K$ (μm) | 15.7 | 14.8 | 15.4 | 13.1 | 21.4 | 24.4 | 23.6 | 26.8 | 23.1 | N.A. | 36.1 |
| $CS_{Na}$ (MPa) | 279 | 221 | 272 | 212 | 258 | 197 | 324 | 165 | 202 | N.A. | 259 |
| $DOL\_ZERO_{Na}$ (μm) | 135.7 | 118.8 | 116.2 | 105.0 | 153.7 | 158.0 | 131.9 | 133.5 | 85.6 | N.A. | 95.1 |

TABLE 6

| (mol %) | No. 49 | No. 50 | No. 51 | No. 52 | No. 53 | No. 54 | No. 55 | No. 56 | No. 57 | No. 58 |
|---|---|---|---|---|---|---|---|---|---|---|
| $SiO_2$ | 56.24 | 61.24 | 61.24 | 60.24 | 62.24 | 62.24 | 60.24 | 60.24 | 62.24 | 63.07 |
| $Al_2O_3$ | 17.81 | 16.81 | 15.81 | 16.81 | 15.81 | 15.81 | 17.81 | 15.81 | 15.81 | 16.81 |
| $B_2O_3$ | 0.00 | 0.00 | 0.00 | 0.00 | 0.50 | 0.00 | 0.00 | 0.00 | 0.50 | 0.00 |
| $Li_2O$ | 8.34 | 8.34 | 8.34 | 8.34 | 8.34 | 5.84 | 5.84 | 5.84 | 5.84 | 4.34 |
| $Na_2O$ | 11.10 | 11.10 | 12.10 | 12.10 | 11.10 | 11.10 | 11.10 | 13.10 | 11.10 | 14.10 |
| $K_2O$ | 4.00 | 0.00 | 0.00 | 0.00 | 0.00 | 2.50 | 2.50 | 2.50 | 2.50 | 0.00 |
| MgO | 0.00 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 1.16 |
| $P_2O_5$ | 2.47 | 2.47 | 2.47 | 2.47 | 1.97 | 2.47 | 2.47 | 2.47 | 1.97 | 0.47 |
| $SnO_2$ | 0.04 | 0.04 | 0.04 | 0.04 | 0.04 | 0.04 | 0.04 | 0.04 | 0.04 | 0.04 |
| $Fe_2O_3$ | 0.01 | 0.01 | 0.01 | 0.01 | 0.01 | 0.01 | 0.01 | 0.01 | 0.01 | 0.01 |
| $TiO_2$ | 0.01 | 0.01 | 0.01 | 0.01 | 0.01 | 0.01 | 0.01 | 0.01 | 0.01 | 0.00 |
| Cl | 0.01 | 0.01 | 0.01 | 0.01 | 0.01 | 0.01 | 0.01 | 0.01 | 0.01 | 0.01 |
| (Na—Li)/(Al + B + P) | 0.14 | 0.14 | 0.21 | 0.19 | 0.15 | 0.29 | 0.26 | 0.40 | 0.29 | 0.56 |
| (B + Na—P)/(Al + Li) | 0.33 | 0.34 | 0.40 | 0.38 | 0.40 | 0.40 | 0.36 | 0.49 | 0.44 | 0.64 |
| Si + 1.2P—3Al—2Li—1.5Na—K—B | −31.56 | −19.56 | −18.06 | −22.06 | −16.66 | −13.06 | −21.06 | −18.06 | −14.16 | −16.62 |
| ρ (g/cm³) | 2.4554 | 2.4234 | 2.4272 | 2.4309 | 2.4189 | 2.4262 | 2.4323 | 2.4401 | 2.4249 | 2.4604 |
| $α_{30-380°C.}$ (×10⁻⁷/°C.) | 107.4 | 88.4 | 92.1 | 92.1 | 87.6 | 96.7 | 95.2 | 102.5 | 95.3 | 90.5 |
| Ts (° C.) | N.A. | 860 | N.A. | N.A. | N.A. | 893 | N.A. | N.A. | N.A. | 890 |
| $10^{2.5}$ dPa·s (° C.) | 1,494 | 1,547 | 1,528 | 1,529 | 1,537 | 1,589 | 1,593 | 1,544 | 1,576 | 1,592 |
| TL (° C.) | 1,018 | N.A. | N.A. | N.A. | N.A. | N.A. | N.A. | N.A. | N.A. | N.A. |
| logη at TL (dPa·s) | 5.39 | N.A. | N.A. | N.A. | N.A. | N.A. | N.A. | N.A. | N.A. | N.A. |
| Acid resistance (HCl 5 wt % 80° C. 24 h) | 34.8< | N.A. | N.A. | N.A. | N.A. | N.A. | N.A. | N.A. | N.A. | 33.3< |
| Alkali resistance (NaOH 5 wt % 80° C. 6 h) | 0.9 | N.A. | N.A. | N.A. | N.A. | N.A. | N.A. | N.A. | N.A. | 0.6 |

TABLE 6-continued

| (mol %) | No. 49 | No. 50 | No. 51 | No. 52 | No. 53 | No. 54 | No. 55 | No. 56 | No. 57 | No. 58 |
|---|---|---|---|---|---|---|---|---|---|---|
| E (GPa) | 77.4 | 76.8 | 76.6 | 76.6 | 76.6 | 74.1 | 75.2 | 74.6 | 74.5 | 76.8 |
| $CS_K$ (MPa) | N.A. | 915 | 894 | 1,173 | 806 | 903 | 986 | 922 | 907 | 1,166 |
| $DOL\_ZERO_K$ (μm) | N.A. | 28.8 | 29.9 | 31.2 | 24.9 | 50.0 | 46.7 | 51.4 | 39.5 | 28.6 |
| $CS_{Na}$ (MPa) | N.A. | 255 | 194 | 227 | 237 | 121 | 162 | 99 | 148 | 153 |
| $DOL\_ZERO_{Na}$ (μm) | N.A. | 132.3 | 140.8 | 150.6 | 147.3 | 129.5 | 131.3 | 92.7 | 103.9 | 124.0 |

TABLE 7

| (mol %) | No. 59 | No. 60 | No. 61 | No. 62 | No. 63 | No. 64 | No. 65 | No. 66 | No. 67 | No. 68 |
|---|---|---|---|---|---|---|---|---|---|---|
| $SiO_2$ | 63.07 | 66.40 | 66.40 | 63.07 | 63.07 | 63.07 | 63.07 | 63.07 | 63.07 | 63.07 |
| $Al_2O_3$ | 16.81 | 8.51 | 8.51 | 16.81 | 16.81 | 16.81 | 16.81 | 17.21 | 15.71 | 15.71 |
| $B_2O_3$ | 0.00 | 0.00 | 0.00 | 0.00 | 0.00 | 0.00 | 0.00 | 0.60 | 0.60 | 0.60 |
| $Li_2O$ | 4.34 | 4.21 | 4.21 | 4.34 | 4.34 | 4.34 | 4.34 | 4.34 | 4.34 | 4.34 |
| $Na_2O$ | 13.10 | 8.55 | 8.55 | 13.10 | 13.10 | 13.10 | 13.10 | 13.10 | 13.10 | 13.10 |
| $K_2O$ | 1.00 | 3.73 | 3.73 | 0.00 | 0.00 | 0.00 | 0.00 | 0.00 | 0.00 | 1.50 |
| MgO | 0.00 | 0.00 | 0.00 | 1.00 | 0.00 | 0.00 | 0.00 | 0.00 | 0.00 | 0.00 |
| ZnO | 1.16 | 6.02 | 4.02 | 1.16 | 1.16 | 1.16 | 2.16 | 1.16 | 1.16 | 1.16 |
| $P_2O_5$ | 0.47 | 0.81 | 2.81 | 0.47 | 1.47 | 0.47 | 0.47 | 0.47 | 1.97 | 0.47 |
| $SnO_2$ | 0.04 | 0.04 | 0.04 | 0.04 | 0.04 | 0.04 | 0.04 | 0.04 | 0.04 | 0.04 |
| $Fe_2O_3$ | 0.01 | 0.01 | 0.01 | 0.01 | 0.01 | 0.01 | 0.01 | 0.01 | 0.01 | 0.01 |
| $TiO_2$ | 0.00 | 1.74 | 1.74 | 0.00 | 0.00 | 1.00 | 0.00 | 0.00 | 0.00 | 0.00 |
| Cl | 0.01 | 0.01 | 0.01 | 0.01 | 0.01 | 0.01 | 0.01 | 0.01 | 0.01 | 0.01 |
| (Na—Li)/(Al + B + P) | 0.51 | 0.47 | 0.38 | 0.51 | 0.48 | 0.51 | 0.51 | 0.48 | 0.48 | 0.52 |
| (B + Na—P)/(Al + Li) | 0.60 | 0.61 | 0.45 | 0.60 | 0.55 | 0.60 | 0.60 | 0.61 | 0.58 | 0.66 |
| Si + 1.2P—3Al—2Li—1.5Na—K—B | −16.12 | 16.89 | 19.29 | −15.12 | −13.92 | −15.12 | −15.12 | −16.92 | −10.62 | −13.92 |
| ρ (g/cm³) | 2.4613 | 2.5352 | 2.4784 | 2.46 | 2.4464 | 2.4583 | 2.4715 | 2.4483 | 2.4369 | 2.4577 |
| $\alpha_{30-380°C.}$ (×$10^{-7}$/°C.) | 93.3 | 90.6 | 90.4 | 86.1 | 85.8 | 86 | 85.2 | 85.9 | 85.8 | 94.4 |
| Ts (°C.) | 902 | 918 | N.A. | 903 | 918 | 903 | 899 | 904 | 873 | 828 |
| $10^{2.5}$ dPa·s (°C.) | 1,488 | 1,603 | 1,531 | 1,591 | 1,613 | 1,597 | 1,596 | 1,598 | 1,599 | 1,582 |
| TL (°C.) | N.A. | N.A. | N.A. | N.A. | N.A. | N.A. | N.A. | N.A. | N.A. | N.A. |
| logη at TL (dPa·s) | N.A. | N.A. | N.A. | N.A. | N.A. | N.A. | N.A. | N.A. | N.A. | N.A. |
| Acid resistance (HCl 5 wt % 80°C. 24 h) | 33.3< | 0 | N.A. | 33.3< | 33.3 | N.A. | N.A. | N.A. | N.A. | N.A. |
| Alkali resistance (NaOH 5 wt % 80°C. 6 h) | 0.6 | 0.6 | N.A. | 0.1 | 0.7 | N.A. | N.A. | N.A. | N.A. | N.A. |
| E (GPa) | 76.9 | 75.1 | 72.6 | 77.5 | 75.4 | 76.4 | 77.1 | 76.0 | 73.8 | 76.0 |
| $CS_K$ (MPa) | 1,138 | 757 | 660 | 1,262 | 1,202 | 1,265 | 1,290 | 1,264 | 1,033 | 964 |
| $DOL\_ZERO_K$ (μm) | 32.9 | 33.8 | 46.0 | 21.8 | 28.2 | 24.6 | 22.2 | 25.4 | 27.8 | 26.1 |
| $CS_{Na}$ (MPa) | 151 | 74 | 35 | 116 | 127 | 167 | 170 | 175 | 147 | 153 |
| $DOL\_ZERO_{Na}$ (μm) | 143.6 | 57.1 | 64.8 | 127.9 | 143.6 | 122.8 | 127.7 | 133.1 | 141.1 | 88.2 |

TABLE 8

| (mol %) | No. 69 | No. 70 | No. 71 | No. 72 | No. 73 | No. 74 | No. 75 | No. 76 | No. 77 | No. 78 |
|---|---|---|---|---|---|---|---|---|---|---|
| $SiO_2$ | 63.07 | 63.07 | 63.22 | 63.94 | 66.40 | 64.76 | 65.76 | 64.76 | 65.76 | 64.24 |
| $Al_2O_3$ | 14.21 | 17.81 | 17.00 | 12.71 | 10.25 | 16.25 | 16.25 | 16.25 | 16.25 | 17.81 |
| $B_2O_3$ | 0.60 | 0.00 | 0.40 | 0.40 | 0.00 | 0.10 | 0.10 | 0.10 | 0.10 | 0.00 |
| $Li_2O$ | 4.34 | 4.34 | 4.34 | 8.34 | 4.21 | 5.20 | 5.20 | 5.70 | 5.70 | 6.34 |
| $Na_2O$ | 13.10 | 13.10 | 13.10 | 11.10 | 8.55 | 11.00 | 11.00 | 10.50 | 10.50 | 11.10 |
| $K_2O$ | 1.50 | 0.00 | 1.50 | 0.50 | 4.23 | 1.25 | 1.25 | 1.25 | 1.25 | 0.00 |
| MgO | 0.00 | 0.00 | 0.00 | 0.50 | 0.00 | 1.00 | 0.00 | 1.00 | 0.00 | 0.00 |
| ZnO | 1.16 | 1.16 | 0.00 | 0.00 | 5.52 | 0.00 | 0.00 | 0.00 | 0.00 | 0.00 |
| $P_2O_5$ | 1.97 | 0.47 | 0.40 | 2.47 | 0.81 | 0.40 | 0.40 | 0.40 | 0.40 | 0.47 |
| $SnO_2$ | 0.04 | 0.04 | 0.04 | 0.04 | 0.04 | 0.04 | 0.04 | 0.04 | 0.04 | 0.04 |
| $Fe_2O_3$ | 0.01 | 0.01 | 0.01 | 0.01 | 0.01 | 0.01 | 0.01 | 0.01 | 0.01 | 0.01 |
| $TiO_2$ | 0.00 | 0.00 | 0.00 | 0.00 | 0.00 | 0.00 | 0.00 | 0.00 | 0.00 | 0.00 |
| Cl | 0.01 | 0.01 | 0.01 | 0.01 | 0.01 | 0.01 | 0.01 | 0.01 | 0.01 | 0.01 |
| (Na—Li)/(Al + B + P) | 0.52 | 0.48 | 0.49 | 0.18 | 0.39 | 0.35 | 0.35 | 0.29 | 0.29 | 0.26 |
| (B + Na—P)/(Al + Li) | 0.63 | 0.57 | 0.61 | 0.43 | 0.53 | 0.50 | 0.50 | 0.46 | 0.46 | 0.44 |
| Si + 1.2P—3Al—2Li—1.5Na—K—B | −7.62 | −18.12 | −17.53 | −5.46 | 11.17 | −11.76 | −10.76 | −2.01 | −11.01 | −17.96 |
| ρ (g/cm³) | 2.4417 | 2.454 | 2.438 | 2.4142 | 2.5106 | N.A. | N.A. | N.A. | N.A. | 2.4243 |
| $\alpha_{30-380°C.}$ (×$10^{-7}$/°C.) | 93.8 | 84.8 | 93.3 | 88.7 | 92.8 | 87.8 | 88.7 | 87.7 | 87.9 | 84.8 |
| Ts (°C.) | N.A. | 937 | 865 | N.A. | N.A. | 883 | 899 | 877 | 893 | 949 |
| $10^{2.5}$ dPa·s (°C.) | 1,567 | 1,613 | 1,611 | 1,486 | 1,527 | 1,609 | 1,639 | 1,605 | 1,634 | 1,617 |
| TL (°C.) | N.A. | N.A. | 943 | N.A. | N.A. | 961 | 965 | 1,016 | 1,005 | 1,087 |

TABLE 8-continued

| (mol %) | No. 69 | No. 70 | No. 71 | No. 72 | No. 73 | No. 74 | No. 75 | No. 76 | No. 77 | No. 78 |
|---|---|---|---|---|---|---|---|---|---|---|
| logη at TL (dPa · s) | N.A. | N.A. | 6.69 | N.A. | N.A. | N.A. | N.A. | N.A. | N.A. | N.A. |
| Acid resistance (HCl 5 wt % 80° C. 24 h) | 2.4 | N.A. | 33.3< | 0.1 | 0 | 43.2 | 48.0 | 34.1 | 31.4 | 31.9 |
| Alkali resistance (NaOH 5 wt % 80° C. 6 h) | 0.2 | N.A. | 0.6 | 0.6 | 0.6 | 0.5 | 0.6 | 0.5 | 0.5 | N.A. |
| E (GPa) | 73.3 | 77.0 | 75.8 | 75.7 | 74.1 | 76.8 | 76.0 | 77.2 | 76.2 | 77.6 |
| $CS_K$ (MPa) | 1,041 | N.A. | 1,026 | 930 | 792 | 1,073 | 1,020 | 1,058 | 1,024 | 1,315 |
| $DOL\_ZERO_K$ (μm) | 40.8 | N.A. | 32.0 | 26.6 | 40.6 | 30.5 | 32.1 | 26.1 | 30.3 | 26.9 |
| $CS_{Na}$ (MPa) | 157 | N.A. | 152 | 119 | 82 | 229 | 213 | 235 | 236 | 281 |
| $DOL\_ZERO_{Na}$ (μm) | 70.3 | N.A. | 121.9 | 118.2 | 69.2 | 108.0 | 117.5 | 115.9 | 115.1 | 134.0 |

TABLE 9

| (mol %) | No. 79 | No. 80 | No. 81 | No. 82 | No. 83 | No. 84 | No. 85 | No. 86 | No. 87 | No. 88 |
|---|---|---|---|---|---|---|---|---|---|---|
| $SiO_2$ | 64.61 | 64.61 | 62.99 | 63.58 | 63.58 | 63.58 | 62.58 | 66.26 | 66.26 | 66.26 |
| $Al_2O_3$ | 17.81 | 18.81 | 17.81 | 16.55 | 16.55 | 15.55 | 17.55 | 16.25 | 16.25 | 16.25 |
| $B_2O_3$ | 0.10 | 0.10 | 0.10 | 0.00 | 0.00 | 0.00 | 0.00 | 0.10 | 0.10 | 0.10 |
| $Li_2O$ | 6.34 | 7.34 | 8.90 | 9.19 | 7.19 | 8.69 | 8.19 | 5.20 | 5.70 | 4.70 |
| $Na_2O$ | 9.85 | 7.85 | 8.90 | 7.09 | 9.09 | 8.59 | 8.09 | 10.50 | 10.00 | 11.00 |
| $K_2O$ | 1.25 | 1.25 | 1.25 | 0.52 | 0.52 | 0.52 | 0.52 | 1.25 | 1.25 | 1.25 |
| MgO | 0.00 | 0.00 | 0.00 | 0.33 | 0.33 | 0.33 | 0.33 | 0.00 | 0.00 | 0.00 |
| ZnO | 0.00 | 0.00 | 0.00 | 0.00 | 0.00 | 0.00 | 0.00 | 0.00 | 0.00 | 0.00 |
| $P_2O_5$ | 0.00 | 0.00 | 0.00 | 2.70 | 2.70 | 2.70 | 2.70 | 0.40 | 0.40 | 0.40 |
| $SnO_2$ | 0.04 | 0.04 | 0.04 | 0.04 | 0.04 | 0.04 | 0.04 | 0.04 | 0.04 | 0.04 |
| $Fe_2O_3$ | 0.01 | 0.01 | 0.01 | 0.01 | 0.01 | 0.01 | 0.01 | 0.01 | 0.01 | 0.01 |
| $TiO_2$ | 0.00 | 0.00 | 0.00 | 0.00 | 0.00 | 0.00 | 0.00 | 0.00 | 0.00 | 0.00 |
| Cl | 0.01 | 0.01 | 0.01 | 0.01 | 0.01 | 0.01 | 0.01 | 0.01 | 0.01 | 0.01 |
| (Na—Li)/(Al + B + P) | 0.20 | 0.03 | 0.00 | −0.11 | 0.10 | −0.01 | 0.00 | 0.32 | 0.26 | 0.38 |
| (B + Na—P)/(Al + Li) | 0.41 | 0.30 | 0.34 | 0.17 | 0.27 | 0.24 | 0.21 | 0.48 | 0.44 | 0.51 |
| Si + 1.2P—3Al—2Li—1.5Na—K—B | −17.63 | −19.63 | −22.95 | −12.37 | −11.37 | −10.62 | −15.87 | −9.51 | −9.76 | −9.26 |
| ρ (g/cm³) | 2.4246 | 2.4243 | N.A. | 2.4019 | 2.4072 | 2.4076 | 2.4091 | 2.4161 | 2.4135 | 2.4133 |
| $α_{30-380° C.}$ (×$10^{-7}$/° C.) | 86.6 | 77.5 | 88.4 | 79 | 82 | 84 | 79.7 | 87.4 | 86.4 | 87.9 |
| Ts (° C.) | 936 | 954 | N.A. | N.A. | 915 | N.A. | 915 | 917 | 913 | 923 |
| $10^{2.5}$ dPa · s (° C.) | 1,616 | 1,602 | 1,556 | 1,589 | 1,610 | 1,575 | N.A. | 1,644 | 1,648 | 1,658 |
| TL (° C.) | 1,080 | 1,270< | N.A. | 1,180 | 1,092 | 1,107 | 1,136 | 990 | 1,034 | 939 |
| logη at TL (dPa · s) | 5.91 | N.A. | N.A. | N.A. | 5.60 | N.A. | N.A. | N.A. | 6.24 | N.A. |
| Acid resistance (HCl 5 wt % 80° C. 24 h) | 34.4 | 34.9 | >100 | 4.1 | 4.3 | 2.2 | 16.6 | 12.0 | 8.4 | 16.7 |
| Alkali resistance (NaOH 5 wt % 80° C. 6 h) | 0.6 | 1.4 | 0.0 | 0.8 | 0.7 | 0.7 | 0.9 | 0.6 | 0.6 | 0.6 |
| E (GPa) | 78.3 | 79.8 | N.A. | 77.3 | 75.8 | 76.6 | 77.1 | 75.9 | 75.9 | 74.9 |
| $CS_K$ (MPa) | 1,273 | 1,319 | 1,071 | 1,059 | 1,074 | 967 | 1,138 | 1,045 | 1,039 | 1,075 |
| $DOL\_ZERO_K$ (μm) | 31.1 | 22.6 | 17.3 | 23.4 | 30.1 | 24.9 | 25.0 | 38.8 | 37.0 | 39.2 |
| $CS_{Na}$ (MPa) | 294 | 352 | 401 | 388 | 280 | 288 | 339 | 240 | 260 | 234 |
| $DOL\_ZERO_{Na}$ (μm) | 116.0 | 108.4 | 87.0 | 113.8 | 122.3 | 120.5 | 111.5 | 121.2 | 129.4 | 114.9 |

TABLE 10

| (mol %) | No. 89 | No. 90 | No. 91 | No. 92 | No. 93 | No. 94 | No. 95 | No. 96 | No. 97 | No. 98 |
|---|---|---|---|---|---|---|---|---|---|---|
| $SiO_2$ | 65.76 | 63.36 | 64.36 | 63.36 | 63.36 | 63.50 | 63.50 | 63.50 | 63.50 | 62.89 |
| $Al_2O_3$ | 16.25 | 17.81 | 17.81 | 17.81 | 17.81 | 15.56 | 17.56 | 15.56 | 14.56 | 17.81 |
| $B_2O_3$ | 0.10 | 0.10 | 0.10 | 0.10 | 0.10 | 0.10 | 0.10 | 0.10 | 0.10 | 0.10 |
| $Li_2O$ | 4.70 | 8.34 | 8.34 | 8.84 | 8.34 | 8.10 | 6.10 | 6.10 | 6.10 | 8.34 |
| $Na_2O$ | 11.50 | 9.10 | 8.10 | 8.60 | 8.60 | 8.00 | 8.00 | 10.00 | 11.00 | 9.10 |
| $K_2O$ | 1.25 | 1.25 | 1.25 | 1.25 | 1.75 | 2.15 | 2.15 | 2.15 | 2.15 | 1.25 |
| MgO | 0.00 | 0.00 | 0.00 | 0.00 | 0.00 | 0.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 |
| $P_2O_5$ | 0.40 | 0.00 | 0.00 | 0.00 | 0.00 | 2.55 | 2.55 | 2.55 | 2.55 | 0.47 |
| $SnO_2$ | 0.04 | 0.04 | 0.04 | 0.04 | 0.04 | 0.04 | 0.04 | 0.04 | 0.04 | 0.04 |
| $Fe_2O_3$ | 0.01 | 0.01 | 0.01 | 0.01 | 0.01 | 0.01 | 0.01 | 0.01 | 0.01 | 0.01 |
| $TiO_2$ | 0.00 | 0.00 | 0.00 | 0.00 | 0.00 | 0.00 | 0.00 | 0.00 | 0.00 | 0.00 |
| Cl | 0.01 | 0.01 | 0.01 | 0.01 | 0.01 | 0.01 | 0.01 | 0.01 | 0.01 | 0.01 |
| (Na—Li)/(Al + B + P) | 0.41 | 0.04 | −0.01 | −0.01 | 0.01 | −0.01 | 0.09 | 0.21 | 0.28 | 0.04 |
| (B + Na—P)/(Al + Li) | 0.53 | 0.35 | 0.31 | 0.33 | 0.33 | 0.23 | 0.23 | 0.35 | 0.41 | 0.33 |

TABLE 10-continued

| (mol %) | No. 89 | No. 90 | No. 91 | No. 92 | No. 93 | No. 94 | No. 95 | No. 96 | No. 97 | No. 98 |
|---|---|---|---|---|---|---|---|---|---|---|
| Si + 1.2P—3Al—2Li—1.5Na—K—B | −10.51 | −21.75 | −19.25 | −22.00 | −21.50 | −10.57 | −12.57 | −9.57 | −8.07 | −21.65 |
| $\rho$ (g/cm³) | 2.4178 | 2.4307 | 2.4217 | 2.4292 | 2.4309 | 2.4088 | 2.4039 | 2.414 | 2.4181 | 2.4268 |
| $\alpha_{30\text{-}380°\,C.}$ (×10⁻⁷/° C.) | 89.5 | 86.3 | 84.12 | 86.9 | 87.9 | 87.9 | 82.6 | 91.4 | 93.7 | 87.9 |
| Ts (° C.) | 902 | N.A. | N.A. | N.A. | N.A. | N.A. | 938 | 860 | 880 | N.A. |
| $10^{2.5}$ dPa · s (° C.) | 1,656 | 1,572 | 1,595 | 1,570 | 1,578 | 1,579 | 1,630 | 1,606 | 1,574 | 1,569 |
| TL (° C.) | 916 | 1,092 | 1,137 | 1,113 | 1,084 | 1,020 | 1,036 | 1,014> | 1,014> | 1,110 |
| log$\eta$ at TL (dPa · s) | N.A. | N.A. | 5.20 | N.A. | N.A. | N.A. | 6.41 | N.A. | N.A. | N.A. |
| Acid resistance (HCl 5 wt % 80° C. 24 h) | 78.6< | 76.4< | 74.7< | 78.2< | 78.3< | 4.8 | 16.2 | 8.0 | 1.2 | 67.5 |
| Alkali resistance (NaOH 5 wt % 80° C. 6 h) | 0.6 | 0.6 | 0.6 | 0.6 | 0.5 | 0.8 | 0.9 | 0.8 | 0.6 | 0.5 |
| E (GPa) | 75.1 | 79.7 | 79.5 | 79.9 | 79.4 | 75.5 | 74.9 | 74.3 | 74.1 | 78.7 |
| $CS_K$ (MPa) | 1,021 | 1,033 | 1,142 | 1,020 | 1,023 | 843 | 1,046 | 895 | N.A. | 1,055 |
| DOL_ZERO$_K$ (μm) | 37.5 | 25.3 | 27.3 | 24.7 | 27.4 | 40.7 | 44.4 | 46.9 | N.A. | 29.0 |
| $CS_{Na}$ (MPa) | 235 | 354 | 401 | 383 | 360 | 287 | 282 | 218 | N.A. | 354 |
| DOL_ZERO$_{Na}$ (μm) | 113.2 | 119.5 | 113.8 | 100.6 | 104.9 | 113.8 | 113.0 | 108.3 | N.A. | 108.5 |

TABLE 11

| (mol %) | No. 99 | No. 100 | No. 101 | No. 102 | No. 103 | No. 104 | No. 105 | No. 106 | No. 107 | No. 108 |
|---|---|---|---|---|---|---|---|---|---|---|
| $SiO_2$ | 62.89 | 62.89 | 62.89 | 62.96 | 63.36 | 62.96 | 62.96 | 65.65 | 64.10 | 64.10 |
| $Al_2O_3$ | 18.81 | 17.81 | 16.81 | 18.81 | 18.81 | 18.81 | 18.10 | 17.56 | 18.10 | 18.10 |
| $B_2O_3$ | 0.10 | 0.10 | 0.10 | 0.10 | 0.10 | 0.10 | 0.10 | 0.10 | 0.10 | 0.10 |
| $Li_2O$ | 7.34 | 7.34 | 8.34 | 7.34 | 7.34 | 7.34 | 8.72 | 6.10 | 6.33 | 6.33 |
| $Na_2O$ | 9.10 | 10.10 | 10.10 | 8.60 | 8.60 | 8.60 | 7.93 | 8.00 | 8.24 | 8.24 |
| $K_2O$ | 1.25 | 1.25 | 1.25 | 0.75 | 0.75 | 0.75 | 0.75 | 2.15 | 1.69 | 0.04 |
| MgO | 0.00 | 0.00 | 0.00 | 1.00 | 1.00 | 1.00 | 0.00 | 0.00 | 0.00 | 0.00 |
| ZnO | 0.00 | 0.00 | 0.00 | 0.00 | 0.00 | 0.00 | 0.00 | 0.00 | 0.00 | 0.00 |
| $P_2O_5$ | 0.47 | 0.47 | 0.47 | 0.40 | 0.00 | 1.40 | 1.40 | 0.40 | 1.40 | 3.05 |
| $SnO_2$ | 0.04 | 0.04 | 0.04 | 0.04 | 0.04 | 0.04 | 0.04 | 0.04 | 0.04 | 0.04 |
| $Fe_2O_3$ | 0.01 | 0.01 | 0.01 | 0.01 | 0.01 | 0.01 | 0.01 | 0.01 | 0.01 | 0.01 |
| $TiO_2$ | 0.00 | 0.00 | 0.00 | 0.00 | 0.00 | 0.00 | 0.00 | 0.00 | 0.00 | 0.00 |
| Cl | 0.01 | 0.01 | 0.01 | 0.01 | 0.01 | 0.01 | 0.01 | 0.01 | 0.01 | 0.01 |
| (Na—Li)/(Al + B + P) | 0.09 | 0.15 | 0.10 | 0.07 | 0.07 | 0.06 | −0.04 | 0.11 | 0.10 | 0.09 |
| (B + Na—P)/(Al + Li) | 0.33 | 0.39 | 0.39 | 0.32 | 0.33 | 0.28 | 0.25 | 0.33 | 0.28 | 0.22 |
| Si + 1.2P—3Al—2Li—1.5Na—K—B | −22.65 | −21.15 | −20.15 | −21.42 | −21.50 | −20.22 | −19.84 | −13.00 | −15.33 | −11.70 |
| $\rho$ (g/cm³) | 2.426 | 2.4299 | 2.4338 | 2.4301 | 2.4328 | 2.4165 | 2.4134 | 2.4171 | 2.4144 | 2.3956 |
| $\alpha_{30\text{-}380°\,C.}$ (×10⁻⁷/° C.) | 82.6 | 91.4 | 93.7 | 78.1 | 79 | 79 | 81.4 | 81.9 | 80.2 | 71.2 |
| Ts (° C.) | 930 | 887 | ↑ | 921 | 927 | 937 | 915 | 974 | 963 | 966 |
| $10^{2.5}$ dPa · s (° C.) | 1,584 | 1,584 | 1,556 | 1,571 | 1,573 | 1,594 | 1,574 | 1,653 | 1,636 | 1,635 |
| TL (° C.) | 1,086 | 1,059 | 1,032 | N.A. | N.A. | N.A. | N.A. | 1,173 | 1,204 | 1,261 |
| log$\eta$ at TL (dPa · s) | 5.71 | N.A. | N.A. | N.A. | N.A. | N.A. | N.A. | 5.40 | 5.00 | 4.60 |
| Acid resistance (HCl 5 wt % 80° C. 24 h) | 77.1 | 76.6 | 61.0 | 55.7 | 51.8 | 38.4 | 36.0 | 35.9 | 33.8 | 3.9 |
| Alkali resistance (NaOH 5 wt % 80° C. 6 h) | 0.7 | 0.5 | 0.5 | 0.8 | 0.7 | 1.0 | 0.8 | 0.7 | 0.9 | 1.2 |
| E (GPa) | 78.8 | 78.3 | 79.1 | 79.7 | 80.6 | 78.2 | 78.4 | 78.0 | 77.1 | 75.6 |
| $CS_K$ (MPa) | 1,176 | 1,056 | 894 | 1,301 | 1,345 | 1,227 | 1,160 | 1,195 | 1,171 | 1,128 |
| DOL_ZERO$_K$ (μm) | 29.4 | 29.6 | 25.3 | 18.7 | 18.1 | 21.3 | 21.8 | 31.5 | 32.7 | 21.8 |
| $CS_{Na}$ (MPa) | 313 | 295 | 330 | 345 | 362 | 324 | 351 | 290 | 303 | 276 |
| DOL_ZERO$_{Na}$ (μm) | 121.7 | 124.0 | 102.4 | 108.4 | 97.4 | 108.6 | 123.7 | 108.7 | 104.6 | 132.6 |

TABLE 12

| (mol %) | No. 109 | No. 110 | No. 111 | No. 112 | No. 113 | No. 114 | No. 115 | No. 116 | No. 117 | No. 118 |
|---|---|---|---|---|---|---|---|---|---|---|
| $SiO_2$ | 62.60 | 64.50 | 64.50 | 64.50 | 64.50 | 64.50 | 64.50 | 64.50 | 64.50 | 64.50 |
| $Al_2O_3$ | 18.10 | 18.50 | 18.50 | 18.50 | 18.50 | 18.50 | 18.50 | 18.50 | 18.50 | 18.50 |
| $B_2O_3$ | 0.10 | 0.10 | 0.10 | 0.10 | 0.10 | 0.10 | 0.10 | 0.10 | 0.10 | 0.10 |
| $Li_2O$ | 6.33 | 6.00 | 7.00 | 8.00 | 6.00 | 7.00 | 8.00 | 6.00 | 7.00 | 8.00 |
| $Na_2O$ | 8.94 | 6.00 | 5.00 | 4.00 | 7.00 | 6.00 | 5.00 | 8.00 | 7.00 | 6.00 |
| $K_2O$ | 0.84 | 0.76 | 0.76 | 0.76 | 0.76 | 0.76 | 0.76 | 0.76 | 0.76 | 0.76 |
| MgO | 0.00 | 0.10 | 0.10 | 0.10 | 0.10 | 0.10 | 0.10 | 0.10 | 0.10 | 0.10 |
| ZnO | 0.00 | 0.00 | 0.00 | 0.00 | 0.00 | 0.00 | 0.00 | 0.00 | 0.00 | 0.00 |
| $P_2O_5$ | 3.05 | 4.00 | 4.00 | 4.00 | 3.00 | 3.00 | 3.00 | 2.00 | 2.00 | 2.00 |
| $SnO_2$ | 0.04 | 0.04 | 0.04 | 0.04 | 0.04 | 0.04 | 0.04 | 0.04 | 0.04 | 0.04 |

TABLE 12-continued

| (mol %) | No. 109 | No. 110 | No. 111 | No. 112 | No. 113 | No. 114 | No. 115 | No. 116 | No. 117 | No. 118 |
|---|---|---|---|---|---|---|---|---|---|---|
| $Fe_2O_3$ | 0.01 | 0.01 | 0.01 | 0.01 | 0.01 | 0.01 | 0.01 | 0.01 | 0.01 | 0.01 |
| $TiO_2$ | 0.00 | 0.00 | 0.00 | 0.00 | 0.00 | 0.00 | 0.00 | 0.00 | 0.00 | 0.00 |
| Cl | 0.01 | 0.01 | 0.01 | 0.01 | 0.01 | 0.01 | 0.01 | 0.01 | 0.01 | 0.01 |
| (Na—Li)/(Al + B + P) | 0.12 | 0.00 | −0.09 | −0.18 | 0.05 | −0.05 | −0.14 | 0.10 | 0.00 | −0.10 |
| (B + Na—P)/(Al + Li) | 0.25 | 0.09 | 0.04 | 0.00 | 0.17 | 0.12 | 0.08 | 0.25 | 0.20 | 0.15 |
| Si + 1.2P—3Al—2Li—1.5Na—K—B | −15.05 | −8.06 | −8.56 | −9.06 | −10.76 | −11.26 | −11.76 | −13.46 | −13.96 | −14.46 |
| ρ (g/cm$^3$) | 2.4049 | 2.3812 | 2.3791 | 2.377 | 2.3945 | 2.3926 | 2.3908 | 2.4074 | 2.4049 | 2.4024 |
| $α_{30\text{-}380° C.}$ (×10$^{-7}$/° C.) | 78.7 | 61.7 | 60.2 | 59.5 | 66.8 | 65.2 | 64 | 71.9 | 70.2 | 69 |
| Ts (° C.) | 947 | 981 | 972 | 966 | 976 | 968 | 961 | 974 | 965 | 957 |
| 10$^{2.5}$ dPa · s (° C.) | 1,642 | 1,644 | 1,632 | 1,618 | 1,636 | 1,623 | 1,612 | 1,630 | 1,618 | 1,609 |
| TL (° C.) | 1,086 | N.A. | N.A. | N.A. | N.A. | N.A. | N.A. | N.A. | N.A. | N.A. |
| logη at TL (dPa · s) | 5.93 | N.A. | N.A. | N.A. | N.A. | N.A. | N.A. | N.A. | N.A. | N.A. |
| Acid resistance (HCl 5 wt % 80° C. 24 h) | 14.1 | 1.6 | 1.9 | 1.5 | 3.0 | 2.5 | 2.3 | 5.2 | 4.3 | 4.1 |
| Alkali resistance (NaOH 5 wt % 80° C. 6 h) | 1.1 | N.A. | 1.4 | N.A. | N.A. | N.A. | N.A. | N.A. | 0.9 | 1.3 |
| E (GPa) | 75.3 | 75.8 | 76.6 | 77.1 | 76.6 | 77.4 | 78.1 | 77.3 | 78.0 | N.A. |
| $CS_K$ (MPa) | 1,106 | 963 | 962 | 963 | 1,047 | 1,049 | 1,055 | 1,149 | 1,141 | 1,129 |
| DOL_ZERO$_K$ (μm) | 28.9 | 20.5 | 21.1 | 18.6 | 24.2 | 21.9 | 18.6 | 24.6 | 22.0 | 20.4 |
| $CS_{Na}$ (MPa) | 262 | 202 | 287 | 286 | 223 | 276 | 286 | 234 | 276 | N.A. |
| DOL_ZERO$_{Na}$ (μm) | 122.6 | 134.4 | 119.2 | 125.3 | 132.8 | 124.9 | 123.6 | 128.1 | 123.7 | N.A. |

TABLE 13

| (mol %) | No. 119 | No. 120 | No. 121 | No. 122 | No. 123 | No. 124 | No. 125 | No. 126 | No. 127 | No. 128 |
|---|---|---|---|---|---|---|---|---|---|---|
| $SiO_2$ | 64.50 | 64.50 | 64.50 | 64.50 | 64.50 | 64.50 | 64.50 | 64.50 | 64.50 | 61.30 |
| $Al_2O_3$ | 18.50 | 18.50 | 18.50 | 18.50 | 18.50 | 18.50 | 18.50 | 18.50 | 18.50 | 15.40 |
| $B_2O_3$ | 0.10 | 0.10 | 0.10 | 0.10 | 0.10 | 0.10 | 0.10 | 0.10 | 0.10 | 0.10 |
| $Li_2O$ | 6.38 | 7.38 | 8.38 | 6.38 | 7.38 | 8.38 | 6.38 | 7.38 | 8.38 | 7.80 |
| $Na_2O$ | 6.38 | 5.38 | 4.38 | 7.38 | 6.38 | 5.38 | 8.38 | 7.38 | 6.38 | 7.00 |
| $K_2O$ | 0.00 | 0.00 | 0.00 | 0.00 | 0.00 | 0.00 | 0.00 | 0.00 | 0.00 | 2.50 |
| MgO | 0.10 | 0.10 | 0.10 | 0.10 | 0.10 | 0.10 | 0.10 | 0.10 | 0.10 | 2.36 |
| ZnO | 0.00 | 0.00 | 0.00 | 0.00 | 0.00 | 0.00 | 0.00 | 0.00 | 0.00 | 0.00 |
| $P_2O_5$ | 4.00 | 4.00 | 4.00 | 3.00 | 3.00 | 3.00 | 2.00 | 2.00 | 2.00 | 3.50 |
| $SnO_2$ | 0.04 | 0.04 | 0.04 | 0.04 | 0.04 | 0.04 | 0.04 | 0.04 | 0.04 | 0.04 |
| $Fe_2O_3$ | 0.01 | 0.01 | 0.01 | 0.01 | 0.01 | 0.01 | 0.01 | 0.01 | 0.01 | 0.01 |
| $TiO_2$ | 0.00 | 0.00 | 0.00 | 0.00 | 0.00 | 0.00 | 0.00 | 0.00 | 0.00 | 0.00 |
| Cl | 0.01 | 0.01 | 0.01 | 0.01 | 0.01 | 0.01 | 0.01 | 0.01 | 0.01 | 0.01 |
| (Na—Li)/(Al + B + P) | 0.00 | −0.09 | −0.18 | 0.05 | −0.05 | −0.14 | 0.10 | 0.00 | −0.10 | −0.04 |
| (B + Na—P)/(Al + Li) | 0.10 | 0.06 | 0.02 | 0.18 | 0.13 | 0.09 | 0.26 | 0.21 | 0.17 | 0.16 |
| Si + 1.2P—3Al—2Li—1.5Na—K—B | −8.63 | −9.13 | −9.63 | −11.33 | −11.83 | −12.33 | −14.03 | −14.53 | −15.03 | −9.40 |
| ρ (g/cm$^3$) | N.A. | N.A. | N.A. | N.A. | N.A. | N.A. | N.A. | N.A. | N.A. | 2.4176 |
| $α_{30\text{-}380° C.}$ (×10$^{-7}$/° C.) | N.A. | N.A. | N.A. | N.A. | N.A. | N.A. | N.A. | N.A. | N.A. | 86.5 |
| Ts (° C.) | N.A. | N.A. | N.A. | N.A. | N.A. | N.A. | N.A. | N.A. | N.A. | 883 |
| 10$^{2.5}$ dPa · s (° C.) | N.A. | N.A. | N.A. | N.A. | N.A. | N.A. | N.A. | N.A. | N.A. | 1,560 |
| TL (° C.) | N.A. | N.A. | N.A. | N.A. | N.A. | N.A. | N.A. | N.A. | N.A. | 1,034 |
| logη at TL (dPa · s) | N.A. | N.A. | N.A. | N.A. | N.A. | N.A. | N.A. | N.A. | N.A. | 5.56 |
| Acid resistance (HCl 5 wt % 80° C. 24 h) | N.A. | N.A. | N.A. | N.A. | N.A. | N.A. | N.A. | N.A. | N.A. | 4.6 |
| Alkali resistance (NaOH 5 wt % 80° C. 6 h) | N.A. | N.A. | N.A. | N.A. | N.A. | N.A. | N.A. | N.A. | N.A. | 1.0 |
| E (GPa) | N.A. | N.A. | N.A. | N.A. | N.A. | N.A. | N.A. | N.A. | N.A. | 76.1 |
| $CS_K$ (MPa) | N.A. | N.A. | N.A. | N.A. | N.A. | N.A. | N.A. | N.A. | N.A. | 919 |
| DOL_ZERO$_K$ (μm) | N.A. | N.A. | N.A. | N.A. | N.A. | N.A. | N.A. | N.A. | N.A. | 35.8 |
| $CS_{Na}$ (MPa) | N.A. | N.A. | N.A. | N.A. | N.A. | N.A. | N.A. | N.A. | N.A. | 228 |
| DOL_ZERO$_{Na}$ (μm) | N.A. | N.A. | N.A. | N.A. | N.A. | N.A. | N.A. | N.A. | N.A. | 108.5 |

TABLE 14

| (mol %) | No. 129 | No. 130 | No. 131 | No. 132 | No. 133 | No. 134 | No. 135 | No. 136 | No. 137 | No. 138 |
|---|---|---|---|---|---|---|---|---|---|---|
| $SiO_2$ | 61.00 | 60.20 | 59.80 | 59.80 | 60.50 | 61.00 | 60.50 | 61.00 | 60.50 | 58.46 |
| $Al_2O_3$ | 15.00 | 15.40 | 16.50 | 15.40 | 15.00 | 15.00 | 15.00 | 15.00 | 15.00 | 16.15 |
| $B_2O_3$ | 0.10 | 0.10 | 0.10 | 0.10 | 0.10 | 0.10 | 0.10 | 0.10 | 0.10 | 0.10 |
| $Li_2O$ | 8.00 | 8.00 | 7.80 | 7.80 | 8.00 | 9.00 | 9.00 | 7.00 | 7.00 | 9.25 |
| $Na_2O$ | 7.80 | 7.80 | 7.00 | 7.00 | 7.80 | 6.80 | 6.80 | 8.80 | 8.80 | 6.75 |

TABLE 14-continued

| (mol %) | No. 129 | No. 130 | No. 131 | No. 132 | No. 133 | No. 134 | No. 135 | No. 136 | No. 137 | No. 138 |
|---|---|---|---|---|---|---|---|---|---|---|
| $K_2O$ | 1.50 | 1.50 | 2.50 | 2.50 | 1.50 | 1.50 | 1.50 | 1.50 | 1.50 | 0.75 |
| MgO | 2.06 | 2.46 | 3.46 | 2.36 | 2.06 | 2.06 | 2.06 | 2.06 | 2.06 | 4.00 |
| ZnO | 0.00 | 0.00 | 0.00 | 0.00 | 0.00 | 0.00 | 0.00 | 0.00 | 0.00 | 0.00 |
| $P_2O_5$ | 4.50 | 4.50 | 2.80 | 4.00 | 5.00 | 4.50 | 5.00 | 4.50 | 5.00 | 4.50 |
| $SnO_2$ | 0.04 | 0.04 | 0.04 | 0.04 | 0.04 | 0.04 | 0.04 | 0.04 | 0.04 | 0.04 |
| $Fe_2O_3$ | 0.01 | 0.01 | 0.01 | 0.01 | 0.01 | 0.01 | 0.01 | 0.01 | 0.01 | 0.01 |
| $TiO_2$ | 0.00 | 0.00 | 0.00 | 0.00 | 0.00 | 0.00 | 0.00 | 0.00 | 0.00 | 0.00 |
| Cl | 0.01 | 0.01 | 0.01 | 0.01 | 0.01 | 0.01 | 0.01 | 0.01 | 0.01 | 0.01 |
| (Na—Li)/(Al + B + P) | −0.01 | −0.01 | −0.04 | −0.04 | −0.01 | −0.11 | −0.11 | 0.09 | 0.09 | −0.12 |
| (B + Na—P)/(Al + Li) | 0.15 | 0.15 | 0.18 | 0.13 | 0.13 | 0.10 | 0.08 | 0.20 | 0.18 | 0.09 |
| Si + 1.2P—3Al—2Li—1.5Na—K—B | −7.90 | −9.90 | −15.04 | −10.30 | −7.80 | −8.40 | −8.30 | −7.40 | −7.30 | −14.07 |
| ρ (g/cm³) | 2.4098 | 2.4145 | 2.435 | 2.417 | 2.4083 | 2.4076 | 2.4049 | 2.4126 | 2.4109 | 2.4254 |
| $\alpha_{30-380°\,C.}$ (×10⁻⁷/° C.) | 86.2 | 86.5 | 86.3 | 87.4 | 86.4 | 84.6 | 84.9 | 88.1 | 88.5 | 80.6 |
| Ts (° C.) | 875 | 873 | N.A. | 879 | 872 | 870 | 864 | 881 | 876 | N.A. |
| $10^{2.5}$ dPa·s (° C.) | 1,554 | 1,545 | 1,524 | 1,553 | 1,554 | 1,546 | 1,543 | 1,566 | 1,565 | 1,492 |
| TL (° C.) | 1,022 | N.A. | 1,040 | N.A. | 1,012 | 1,080 | 1,069 | 992 | 989 | 1,117 |
| logη at TL (dPa·s) | 5.47 | N.A. | 5.53 | N.A. | 5.46 | N.A. | N.A. | N.A. | N.A. | 4.46 |
| Acid resistance (HCl 5 wt % 80° C. 24 h) | 2.2 | 4.7 | 38.8 | 5.8 | 2.3 | 1.8 | 2.1 | 2.2 | 2.4 | 8.9 |
| Alkali resistance (NaOH 5 wt % 80° C. 6 h) | 1.2 | 1.1 | 1.0 | 1.3 | 1.3 | 1.0 | 1.1 | 1.2 | 1.2 | 1.3 |
| E (GPa) | 75.3 | N.A. | 78.6 | N.A. | 76.7 | 76.0 | 75.4 | 74.5 | 74.1 | 78.3 |
| $CS_K$ (MPa) | 878 | 920 | 1,015 | 916 | 873 | 912 | 886 | 923 | 897 | 1,006 |
| $DOL\_ZERO_K$ (μm) | 36.5 | 36.1 | 29.9 | 38.0 | 34.6 | 29.5 | 31.8 | 36.2 | 36.7 | 22.0 |
| $CS_{Na}$ (MPa) | 223 | N.A. | 257 | N.A. | 173 | 283 | 291 | 228 | 228 | 338 |
| $DOL\_ZERO_{Na}$ (μm) | 123.2 | N.A. | 95.5 | N.A. | 123.5 | 122.0 | 119.1 | 117.8 | 111.7 | 116.3 |

TABLE 15

| (mol %) | No. 139 | No. 140 | No. 141 | No. 142 | No. 143 | No. 144 | No. 145 | No. 146 | No. 147 | No. 148 |
|---|---|---|---|---|---|---|---|---|---|---|
| $SiO_2$ | 61.26 | 68.20 | 68.20 | 61.30 | 60.40 | 68.20 | 70.20 | 61.40 | 60.30 | 60.73 |
| $Al_2O_3$ | 15.40 | 9.50 | 9.50 | 15.40 | 16.15 | 9.50 | 9.50 | 18.50 | 18.80 | 18.94 |
| $B_2O_3$ | 0.10 | 0.10 | 0.10 | 0.10 | 0.10 | 0.10 | 0.10 | 0.10 | 0.10 | 0.10 |
| $Li_2O$ | 8.64 | 9.00 | 8.00 | 7.80 | 9.25 | 9.00 | 9.00 | 6.80 | 7.20 | 7.50 |
| $Na_2O$ | 6.46 | 8.16 | 8.16 | 7.00 | 6.75 | 6.16 | 6.16 | 8.40 | 8.10 | 7.85 |
| $K_2O$ | 2.50 | 3.00 | 3.00 | 2.50 | 0.75 | 3.00 | 3.00 | 0.30 | 0.45 | 0.30 |
| MgO | 2.40 | 2.00 | 3.00 | 2.36 | 2.06 | 4.00 | 2.00 | 0.50 | 0.50 | 0.50 |
| ZnO | 0.00 | 0.00 | 0.00 | 0.00 | 0.00 | 0.00 | 0.00 | 0.00 | 0.00 | 0.00 |
| $P_2O_5$ | 3.20 | 0.00 | 0.00 | 3.50 | 4.50 | 0.00 | 0.00 | 3.96 | 4.30 | 4.50 |
| $SnO_2$ | 0.04 | 0.04 | 0.04 | 0.04 | 0.04 | 0.04 | 0.04 | 0.04 | 0.16 | 0.16 |
| $Fe_2O_3$ | 0.01 | 0.01 | 0.01 | 0.01 | 0.01 | 0.01 | 0.01 | 0.01 | 0.01 | 0.01 |
| $TiO_2$ | 0.00 | 0.00 | 0.00 | 0.00 | 0.00 | 0.00 | 0.00 | 0.00 | 0.00 | 0.00 |
| Cl | 0.01 | 0.01 | 0.01 | 0.01 | 0.01 | 0.01 | 0.01 | 0.01 | 0.10 | 0.10 |
| (Na—Li)/(Al + B + P) | −0.12 | −0.09 | 0.02 | −0.04 | −0.12 | −0.30 | −0.30 | 0.07 | 0.04 | 0.01 |
| (B + Na—P)/(Al + Li) | 0.14 | 0.45 | 0.47 | 0.16 | 0.09 | 0.34 | 0.34 | 0.18 | 0.15 | 0.13 |
| Si + 1.2P—3Al—2Li—1.5Na—K—B | −10.67 | 6.36 | 8.36 | −9.40 | −12.13 | 9.36 | 11.36 | −15.95 | −18.04 | −17.86 |
| ρ (g/cm³) | 2.4200 | 2.4279 | 2.4264 | 2.4181 | 2.4088 | 2.4239 | 2.4100 | 2.4022 | 2.4068 | N.A. |
| $\alpha_{30-380°\,C.}$ (×10⁻⁷/° C.) | 87.4 | 94.3 | 95.9 | 87.5 | 79.5 | 88.8 | 86.7 | 74.9 | 74.8 | N.A. |
| Ts (° C.) | N.A. | 701 | 685 | 884 | N.A. | 713 | 713 | 931 | 926 | N.A. |
| $10^{2.5}$ dPa·s (° C.) | 1,537 | 1,427 | 1,435 | 1,556 | 1,534 | 1,445 | 1,479 | 1,596 | 1,579 | N.A. |
| TL (° C.) | 1,055 | 879 | 884 | N.A. | N.A. | N.A. | N.A. | 1,080 | 1,140 | N.A. |
| logη at TL (dPa·s) | 5.28 | N.A. | N.A. | N.A. | N.A. | N.A. | N.A. | 5.82 | 5.3 | N.A. |
| Acid resistance (HCl 5 wt % 80° C. 24 h) | 3.9 | 0.0 | 0.0 | 3.8 | 5.4 | 0.0 | 0.0 | 13.5 | 20.7 | N.A. |
| Alkali resistance (NaOH 5 wt % 80° C. 6 h) | 1.0 | 0.6 | 0.6 | 0.9 | 1.1 | 0.5 | 0.6 | 1.2 | 1.1 | N.A. |
| E (GPa) | 77.3 | 77.6 | 77.4 | 76.2 | 76.9 | 78.8 | 77.6 | N.A. | 75.9 | N.A. |
| $CS_K$ (MPa) | 934 | 506 | 473 | 943 | 957 | 561 | 508 | 1,067 | 1,072 | N.A. |
| $DOL\_ZERO_K$ (μm) | 36.5 | 17.3 | 19.8 | 38.3 | 25.9 | 14.7 | 19.0 | 25.0 | 25.2 | N.A. |
| $CS_{Na}$ (MPa) | 312 | 136 | 175 | N.A. | N.A. | N.A. | N.A. | 291 | 260 | N.A. |
| $DOL\_ZERO_{Na}$ (μm) | 101.3 | 78.7 | 62.3 | N.A. | N.A. | N.A. | N.A. | 132.5 | 125.8 | N.A. |

TABLE 16

| (mol %) | No. 149 | No. 150 | No. 151 | No. 152 | No. 153 | No. 154 | No. 155 | No. 156 | No. 157 | No. 158 |
|---|---|---|---|---|---|---|---|---|---|---|
| $SiO_2$ | 61.02 | 60.55 | 60.73 | 60.43 | 66.16 | 64.12 | 62.82 | 62.35 | 61.84 | 61.42 |
| $Al_2O_3$ | 18.57 | 18.51 | 18.51 | 18.76 | 11.85 | 14.09 | 15.44 | 15.95 | 16.51 | 16.87 |
| $B_2O_3$ | 0.12 | 0.11 | 0.11 | 0.10 | 0.36 | 0.31 | 0.33 | 0.31 | 0.21 | 0.26 |
| $Li_2O$ | 7.13 | 6.91 | 6.82 | 7.22 | 0.52 | 2.61 | 3.81 | 4.24 | 4.81 | 5.23 |
| $Na_2O$ | 8.21 | 8.38 | 8.48 | 8.08 | 14.66 | 12.79 | 11.74 | 11.34 | 10.87 | 10.52 |
| $K_2O$ | 0.35 | 0.49 | 0.49 | 0.44 | 1.29 | 1.03 | 0.87 | 0.81 | 0.74 | 0.70 |
| MgO | 0.72 | 0.67 | 0.67 | 0.52 | 4.64 | 3.40 | 2.62 | 2.35 | 2.06 | 1.85 |
| ZnO | 0.00 | 0.00 | 0.00 | 0.00 | 0.00 | 0.00 | 0.00 | 0.00 | 0.00 | 0.00 |
| $P_2O_5$ | 4.28 | 4.13 | 3.94 | 4.31 | 0.23 | 1.43 | 2.16 | 2.45 | 2.77 | 2.97 |
| $SnO_2$ | 0.16 | 0.16 | 0.16 | 0.05 | 0.15 | 0.12 | 0.09 | 0.09 | 0.08 | 0.08 |
| $Fe_2O_3$ | 0.01 | 0.01 | 0.01 | 0.00 | 0.00 | 0.00 | 0.00 | 0.00 | 0.00 | 0.00 |
| $TiO_2$ | 0.00 | 0.00 | 0.00 | 0.00 | 0.01 | 0.01 | 0.01 | 0.01 | 0.01 | 0.01 |
| Cl | 0.10 | 0.10 | 0.10 | 0.10 | 0.10 | 0.08 | 0.07 | 0.07 | 0.07 | 0.07 |
| (Na—Li)/(Al + B + P) | 0.05 | 0.06 | 0.07 | 0.04 | 1.14 | 0.64 | 0.44 | 0.38 | 0.31 | 0.26 |
| (B + Na—P)/(Al + Li) | 0.16 | 0.17 | 0.18 | 0.15 | 1.20 | 0.70 | 0.51 | 0.46 | 0.39 | 0.35 |
| Si + 1.2P—3Al—2Li—1.5Na—K—B | −16.59 | −17.02 | −17.02 | −17.78 | 6.19 | −2.16 | −7.33 | −9.16 | −11.24 | −12.82 |
| ρ (g/cm³) | 2.4068 | N.A. | 2.4092 | N.A. | 2.4483 | 2.439 | 2.4326 | 2.429 | 2.4257 | 2.4231 |
| $\alpha_{30-380°C.}$ (×$10^{-7}$/° C.) | 73.5 | N.A. | 75.7 | N.A. | N.A. | N.A. | N.A. | N.A. | N.A. | N.A. |
| Ts (° C.) | 923 | N.A. | 927 | N.A. | N.A. | N.A. | N.A. | N.A. | N.A. | N.A. |
| $10^{2.5}$ dPa · s (° C.) | 1,293 | N.A. | 1,587 | N.A. | N.A. | N.A. | N.A. | N.A. | N.A. | N.A. |
| TL (° C.) | 1,125 | N.A. | 1,125 | N.A. | N.A. | N.A. | N.A. | N.A. | N.A. | N.A. |
| logη at TL (dPa · s) | 5.3 | N.A. | 5.3 | N.A. | N.A. | N.A. | N.A. | N.A. | N.A. | N.A. |
| Acid resistance (HCl 5 wt % 80° C. 24 h) | 19.1 | N.A. | 20.7 | N.A. | N.A. | N.A. | N.A. | N.A. | N.A. | N.A. |
| Alkali resistance (NaOH 5 wt % 80° C. 6 h) | 1.3 | N.A. | 1.1 | N.A. | N.A. | N.A. | N.A. | N.A. | N.A. | N.A. |
| E (GPa) | N.A. | N.A. | 76 | N.A. | N.A. | N.A. | N.A. | N.A. | N.A. | N.A. |
| $CS_K$ (MPa) | 1,064 | N.A. | 1,086 | N.A. | N.A. | N.A. | N.A. | 1,164 | 1,151 | 1,138 |
| $DOL\_ZERO_K$ (μm) | 26.6 | N.A. | 23.5 | N.A. | N.A. | N.A. | N.A. | 31.6 | 29 | 26.1 |
| $CS_{Na}$ (MPa) | 271 | N.A. | 246 | N.A. | N.A. | N.A. | N.A. | 168 | 198 | 214 |
| $DOL\_ZERO_{Na}$ (μm) | 132.0 | N.A. | 132.1 | N.A. | N.A. | N.A. | N.A. | 92.8 | 89.6 | 90.4 |

TABLE 17

| (mol %) | No. 159 | No. 160 | No. 161 | No. 162 | No. 163 | No. 164 | No. 165 | No. 166 | No. 167 | No. 168 |
|---|---|---|---|---|---|---|---|---|---|---|
| $SiO_2$ | 61.13 | 60.80 | 60.45 | 60.27 | 60.09 | 59.88 | 59.76 | 59.64 | 59.64 | 59.63 |
| $Al_2O_3$ | 17.24 | 17.62 | 17.85 | 18.12 | 18.35 | 18.55 | 18.73 | 18.81 | 18.91 | 18.99 |
| $B_2O_3$ | 0.24 | 0.22 | 0.27 | 0.26 | 0.20 | 0.23 | 0.22 | 0.17 | 0.20 | 0.16 |
| $Li_2O$ | 5.55 | 5.91 | 6.31 | 6.51 | 6.74 | 7.02 | 7.17 | 7.41 | 7.41 | 7.49 |
| $Na_2O$ | 10.19 | 9.85 | 9.57 | 9.34 | 9.13 | 8.91 | 8.74 | 8.64 | 8.53 | 8.45 |
| $K_2O$ | 0.66 | 0.62 | 0.59 | 0.56 | 0.53 | 0.51 | 0.49 | 0.48 | 0.47 | 0.47 |
| MgO | 1.65 | 1.44 | 1.29 | 1.16 | 1.04 | 0.90 | 0.79 | 0.71 | 0.65 | 0.58 |
| ZnO | 0.00 | 0.00 | 0.00 | 0.00 | 0.00 | 0.00 | 0.00 | 0.00 | 0.00 | 0.00 |
| $P_2O_5$ | 3.17 | 3.37 | 3.50 | 3.64 | 3.76 | 3.86 | 3.95 | 4.00 | 4.05 | 4.10 |
| $SnO_2$ | 0.07 | 0.07 | 0.06 | 0.06 | 0.06 | 0.05 | 0.05 | 0.05 | 0.05 | 0.05 |
| $Fe_2O_3$ | 0.00 | 0.00 | 0.00 | 0.00 | 0.00 | 0.00 | 0.00 | 0.00 | 0.00 | 0.00 |
| $TiO_2$ | 0.01 | 0.01 | 0.01 | 0.01 | 0.01 | 0.01 | 0.01 | 0.01 | 0.01 | 0.01 |
| Cl | 0.07 | 0.06 | 0.06 | 0.06 | 0.06 | 0.06 | 0.06 | 0.06 | 0.06 | 0.06 |
| (Na—Li)/(Al + B + P) | 0.23 | 0.19 | 0.15 | 0.13 | 0.11 | 0.08 | 0.07 | 0.05 | 0.05 | 0.04 |
| (B + Na—P)/(Al + Li) | 0.32 | 0.28 | 0.26 | 0.24 | 0.22 | 0.21 | 0.19 | 0.18 | 0.18 | 0.17 |
| Si + 1.2P—3Al—2Li—1.5Na—K—B | −14.08 | −15.46 | −16.74 | −17.57 | −18.34 | −19.28 | −19.86 | −20.40 | −20.51 | −20.70 |
| ρ (g/cm³) | 2.4203 | 2.4179 | 2.4164 | 2.4147 | 2.4132 | 2.4117 | 2.4105 | 2.4097 | 2.4085 | 2.4081 |
| $\alpha_{30-380°C.}$ (×$10^{-7}$/° C.) | N.A. | N.A. | N.A. | N.A. | N.A. | N.A. | N.A. | N.A. | N.A. | N.A. |
| Ts (° C.) | N.A. | 895 | N.A. | N.A. | N.A. | N.A. | N.A. | N.A. | N.A. | N.A. |
| $10^{2.5}$ dPa · s (° C.) | N.A. | 1,587 | N.A. | N.A. | N.A. | N.A. | N.A. | N.A. | N.A. | N.A. |
| TL (° C.) | N.A. | N.A. | N.A. | N.A. | N.A. | N.A. | N.A. | N.A. | N.A. | N.A. |
| logη at TL (dPa · s) | N.A. | N.A. | N.A. | N.A. | N.A. | N.A. | N.A. | N.A. | N.A. | N.A. |
| Acid resistance (HCl 5 wt % 80° C. 24 h) | N.A. | N.A. | N.A. | N.A. | N.A. | N.A. | N.A. | N.A. | N.A. | N.A. |
| Alkali resistance (NaOH 5 wt % 80° C. 6 h) | N.A. | N.A. | N.A. | N.A. | N.A. | N.A. | N.A. | N.A. | N.A. | N.A. |
| E (GPa) | N.A. | N.A. | N.A. | N.A. | N.A. | N.A. | N.A. | N.A. | N.A. | N.A. |
| $CS_K$ (MPa) | 1,133 | 1,126 | 1,122 | 1,122 | 1,112 | 1,114 | 1,114 | 1,117.44 | 1,100 | 1,103 |
| $DOL\_ZERO_K$ (μm) | 24.8 | 24.1 | 23.4 | 22.8 | 22.3 | 22.4 | 22.3 | 21.4265 | 22.2 | 21.7 |
| $CS_{Na}$ (MPa) | 216 | 218 | 235 | 236 | 253 | 259 | 260 | 249 | 268 | 273 |
| $DOL\_ZERO_{Na}$ (μm) | 96.7 | 102.8 | 95 | 96.5 | 97.5 | 101.5 | 98.4 | 107 | 99.7 | 100.7 |

TABLE 18

| (mol %) | No. 169 | No. 170 | No. 171 | No. 172 | No. 173 | No. 174 | No. 175 | No. 176 | No. 177 | No. 178 |
|---|---|---|---|---|---|---|---|---|---|---|
| $SiO_2$ | 59.52 | 59.57 | 59.69 | 59.77 | 59.89 | 59.97 | 59.86 | 59.91 | 59.97 | 60.13 |
| $Al_2O_3$ | 19.00 | 18.99 | 18.99 | 18.94 | 18.94 | 18.97 | 18.97 | 18.98 | 18.93 | 18.91 |
| $B_2O_3$ | 0.19 | 0.21 | 0.23 | 0.20 | 0.12 | 0.10 | 0.13 | 0.18 | 0.19 | 0.18 |
| $Li_2O$ | 7.65 | 7.65 | 7.54 | 7.57 | 7.55 | 7.51 | 7.66 | 7.57 | 7.53 | 7.42 |
| $Na_2O$ | 8.38 | 8.34 | 8.30 | 8.27 | 8.27 | 8.24 | 8.22 | 8.21 | 8.22 | 8.20 |
| $K_2O$ | 0.47 | 0.46 | 0.46 | 0.46 | 0.46 | 0.45 | 0.45 | 0.45 | 0.45 | 0.45 |
| MgO | 0.53 | 0.48 | 0.45 | 0.43 | 0.40 | 0.37 | 0.33 | 0.31 | 0.34 | 0.32 |
| ZnO | 0.00 | 0.00 | 0.00 | 0.00 | 0.00 | 0.00 | 0.00 | 0.00 | 0.00 | 0.00 |
| $P_2O_5$ | 4.12 | 4.15 | 4.18 | 4.20 | 4.22 | 4.24 | 4.24 | 4.23 | 4.22 | 4.24 |
| $SnO_2$ | 0.05 | 0.05 | 0.05 | 0.05 | 0.05 | 0.05 | 0.05 | 0.04 | 0.05 | 0.04 |
| $Fe_2O_3$ | 0.00 | 0.00 | 0.00 | 0.00 | 0.00 | 0.00 | 0.00 | 0.00 | 0.00 | 0.00 |
| $TiO_2$ | 0.01 | 0.01 | 0.01 | 0.01 | 0.01 | 0.01 | 0.01 | 0.01 | 0.01 | 0.01 |
| Cl | 0.06 | 0.06 | 0.06 | 0.06 | 0.06 | 0.06 | 0.06 | 0.07 | 0.06 | 0.07 |
| (Na—Li)/(Al + B + P) | 0.03 | 0.03 | 0.03 | 0.03 | 0.03 | 0.03 | 0.02 | 0.03 | 0.03 | 0.03 |
| (B + Na—P)/(Al + Li) | 0.17 | 0.16 | 0.16 | 0.16 | 0.16 | 0.15 | 0.15 | 0.15 | 0.16 | 0.16 |
| Si + 1.2P—3Al—2Li—1.5Na—K—B | −21.06 | −20.91 | −20.50 | −20.23 | −19.96 | −19.80 | −20.17 | −20.04 | −19.78 | −19.28 |
| ρ (g/cm³) | 2.4076 | 2.4065 | 2.4055 | 2.4048 | 2.4038 | 2.4034 | 2.4029 | 2.4027 | 2.4029 | 2.4016 |
| $α_{30-380°\,C.}$ (×10⁻⁷/° C.) | N.A. | N.A. | N.A. | N.A. | N.A. | N.A. | N.A. | N.A. | N.A. | N.A. |
| Ts (° C.) | N.A. | 902 | N.A. | N.A. | N.A. | N.A. | N.A. | N.A. | 907 | N.A. |
| $10^{2.5}$ dPa · s (° C.) | N.A. | 1,577 | N.A. | N.A. | N.A. | N.A. | N.A. | N.A. | 1,577 | N.A. |
| TL (° C.) | N.A. | N.A. | N.A. | N.A. | N.A. | N.A. | N.A. | N.A. | N.A. | N.A. |
| logη at TL (dPa · s) | N.A. | N.A. | N.A. | N.A. | N.A. | N.A. | N.A. | N.A. | N.A. | N.A. |
| Acid resistance (HCl 5 wt % 80° C. 24 h) | N.A. | 29.6 | N.A. | N.A. | N.A. | N.A. | N.A. | N.A. | 21.6 | N.A. |
| Alkali resistance (NaOH 5 wt % 80° C. 6 h) | N.A. | 1.6 | N.A. | N.A. | N.A. | N.A. | N.A. | N.A. | 1.6 | N.A. |
| E (GPa) | N.A. | N.A. | N.A. | N.A. | N.A. | N.A. | N.A. | N.A. | N.A. | N.A. |
| $CS_K$ (MPa) | 1,103 | 1,102 | 1,108 | 1,108 | 1,108 | 1,112 | 1,104 | 1,109 | 1,108 | N.A. |
| $DOL\_ZERO_K$ (μm) | 21.3 | 21.3 | 22 | 23.4 | 23.6 | 23.7 | 23.5 | 23.3 | 24.4 | N.A. |
| $CS_{Na}$ (MPa) | 274 | 264 | 276 | 258 | 251 | 262 | 271 | 269 | 264 | N.A. |
| $DOL\_ZERO_{Na}$ (μm) | 94.9 | 100.5 | 106.5 | 106.7 | 91.2 | 101.7 | 98.4 | 106.3 | 99.6 | N.A. |

TABLE 19

| (mol %) | No. 179 | No. 180 | No. 181 | No. 182 | No. 183 | No. 184 | No. 185 | No. 186 | No. 187 | No. 188 |
|---|---|---|---|---|---|---|---|---|---|---|
| $SiO_2$ | 60.16 | 60.18 | 60.28 | 60.15 | 60.20 | 60.14 | 60.38 | 60.38 | 60.38 | 60.28 |
| $Al_2O_3$ | 18.92 | 18.91 | 18.95 | 18.93 | 18.95 | 18.95 | 18.57 | 18.57 | 18.57 | 18.67 |
| $B_2O_3$ | 0.19 | 0.22 | 0.20 | 0.22 | 0.17 | 0.18 | 0.10 | 0.10 | 0.10 | 0.10 |
| $Li_2O$ | 7.38 | 7.37 | 7.22 | 7.40 | 7.39 | 7.45 | 7.13 | 7.63 | 7.13 | 7.13 |
| $Na_2O$ | 8.18 | 8.18 | 8.20 | 8.17 | 8.17 | 8.17 | 8.21 | 8.21 | 8.21 | 8.21 |
| $K_2O$ | 0.45 | 0.44 | 0.44 | 0.44 | 0.43 | 0.43 | 0.35 | 0.35 | 0.85 | 0.35 |
| MgO | 0.29 | 0.27 | 0.26 | 0.23 | 0.22 | 0.20 | 0.72 | 0.72 | 0.72 | 0.72 |
| ZnO | 0.00 | 0.00 | 0.00 | 0.00 | 0.00 | 0.00 | 0.00 | 0.00 | 0.00 | 0.00 |
| $P_2O_5$ | 4.27 | 4.27 | 4.28 | 4.29 | 4.30 | 4.30 | 4.28 | 3.78 | 3.78 | 4.28 |
| $SnO_2$ | 0.04 | 0.04 | 0.05 | 0.05 | 0.05 | 0.05 | 0.16 | 0.16 | 0.16 | 0.16 |
| $Fe_2O_3$ | 0.00 | 0.00 | 0.00 | 0.00 | 0.00 | 0.00 | 0.00 | 0.00 | 0.00 | 0.00 |
| $TiO_2$ | 0.01 | 0.01 | 0.01 | 0.01 | 0.01 | 0.01 | 0.00 | 0.00 | 0.00 | 0.00 |
| Cl | 0.07 | 0.07 | 0.07 | 0.08 | 0.08 | 0.08 | 0.10 | 0.10 | 0.10 | 0.10 |
| (Na—Li)/(Al + B + P) | 0.03 | 0.03 | 0.04 | 0.03 | 0.03 | 0.03 | 0.05 | 0.03 | 0.05 | 0.05 |
| (B + Na—P)/(Al + Li) | 0.16 | 0.16 | 0.16 | 0.16 | 0.15 | 0.15 | 0.16 | 0.17 | 0.18 | 0.16 |
| Si + 1.2P—3Al—2Li—1.5Na—K—B | −19.14 | −19.09 | −18.83 | −19.22 | −19.12 | −19.32 | −17.22 | −18.82 | −18.32 | −17.62 |
| ρ (g/cm³) | 2.4017 | 2.4015 | 2.4011 | N.A. | N.A. | 2.4005 | 2.4068 | 2.4114 | 2.4128 | 2.4076 |
| $α_{30-380°\,C.}$ (×10⁻⁷/° C.) | N.A. | N.A. | N.A. | N.A. | N.A. | N.A. | 73.5 | 75.7 | 76.8 | 75.1 |
| Ts (° C.) | N.A. | N.A. | 908 | N.A. | N.A. | N.A. | 923 | 919 | 919 | 920 |
| $10^{2.5}$ dPa · s (° C.) | N.A. | N.A. | 1,575 | N.A. | N.A. | N.A. | 1,580 | 1,566 | 1,574 | 1,573 |
| TL (° C.) | N.A. | N.A. | N.A. | N.A. | N.A. | N.A. | 1,125 | 1,113 | 1,167 | 1,136 |
| logη at TL (dPa · s) | N.A. | N.A. | N.A. | N.A. | N.A. | N.A. | 5.3 | 5.3 | 4.9 | 5.2 |
| Acid resistance (HCl 5 wt % 80° C. 24 h) | N.A. | N.A. | 19.9 | N.A. | N.A. | N.A. | 19.1 | 30.4 | 33.5 | 20.6 |
| Alkali resistance (NaOH 5 wt % 80° C. 6 h) | N.A. | N.A. | 1.5 | N.A. | N.A. | N.A. | 1.3 | 1.3 | 1.3 | 1.4 |
| E (GPa) | N.A. | N.A. | N.A. | N.A. | N.A. | N.A. | N.A. | N.A. | N.A. | N.A. |
| $CS_K$ (MPa) | N.A. | 1,101 | 1,094 | 1,100 | 1,093 | 1,096 | 1,064 | 1,086 | 1,067 | 1,055 |
| $DOL\_ZERO_K$ (μm) | N.A. | 24.8 | 24.5 | 23.6 | 24.3 | 23.7 | 27 | 23 | 28 | 25 |
| $CS_{Na}$ (MPa) | N.A. | 272 | 269 | 249 | 246 | 244 | 271 | 294 | 263 | 253 |
| $DOL\_ZERO_{Na}$ (μm) | N.A. | 110.8 | 103.2 | 111.7 | 103.1 | 105 | 132 | 127 | 131 | 129 |

TABLE 20

| (mol %) | No. 189 | No. 190 | No. 191 | No. 192 | No. 193 | No. 194 | No. 195 | No. 196 | No. 197 | No. 198 |
|---|---|---|---|---|---|---|---|---|---|---|
| $SiO_2$ | 60.28 | 60.28 | 59.88 | 59.88 | 59.78 | 59.78 | 60.33 | 60.36 | 60.38 | 63.42 |
| $Al_2O_3$ | 18.67 | 18.67 | 18.67 | 18.57 | 18.67 | 18.67 | 18.80 | 18.80 | 18.80 | 15.12 |
| $B_2O_3$ | 0.10 | 0.10 | 0.10 | 0.10 | 0.10 | 0.10 | 0.10 | 0.10 | 0.10 | 0.28 |
| $Li_2O$ | 7.63 | 7.13 | 7.63 | 7.13 | 7.63 | 7.13 | 7.20 | 7.20 | 7.20 | 3.61 |
| $Na_2O$ | 8.21 | 8.21 | 8.21 | 8.21 | 8.21 | 8.21 | 8.10 | 8.10 | 8.10 | 11.63 |
| $K_2O$ | 0.35 | 0.85 | 0.35 | 0.85 | 0.35 | 0.85 | 0.45 | 0.45 | 0.45 | 0.91 |
| MgO | 0.72 | 0.72 | 0.72 | 0.72 | 0.72 | 0.72 | 0.50 | 0.50 | 0.50 | 2.66 |
| ZnO | 0.00 | 0.00 | 0.00 | 0.00 | 0.00 | 0.00 | 0.00 | 0.00 | 0.00 | 0.00 |
| $P_2O_5$ | 3.78 | 3.78 | 4.28 | 4.28 | 4.28 | 4.28 | 4.30 | 4.30 | 4.30 | 2.15 |
| $SnO_2$ | 0.16 | 0.16 | 0.16 | 0.16 | 0.16 | 0.16 | 0.12 | 0.09 | 0.07 | 0.11 |
| $Fe_2O_3$ | 0.00 | 0.00 | 0.00 | 0.00 | 0.00 | 0.00 | 0.00 | 0.00 | 0.00 | 0.00 |
| $TiO_2$ | 0.00 | 0.00 | 0.00 | 0.00 | 0.00 | 0.00 | 0.00 | 0.00 | 0.00 | 0.00 |
| Cl | 0.10 | 0.10 | 0.10 | 0.10 | 0.10 | 0.10 | 0.10 | 0.10 | 0.10 | 0.10 |
| (Na—Li)/(Al + B + P) | 0.03 | 0.05 | 0.03 | 0.05 | 0.03 | 0.05 | 0.04 | 0.04 | 0.04 | 0.46 |
| (B + Na—P)/(Al + Li) | 0.17 | 0.18 | 0.16 | 0.17 | 0.16 | 0.16 | 0.15 | 0.15 | 0.15 | 0.52 |
| Si + 1.2P—3Al—2Li—1.5Na—K—B | −19.22 | −18.72 | −18.72 | −18.22 | −19.12 | −18.62 | −18.01 | −17.98 | −17.96 | −5.23 |
| ρ (g/cm³) | 2.4124 | 2.4133 | 2.4095 | 2.41 | 2.4096 | 2.4107 | 2.4052 | 2.4046 | 2.4036 | 2.4299 |
| $\alpha_{30-380°\,C.}$ (×10⁻⁷/° C.) | 75.1 | 77.5 | 76.1 | 77.7 | 76.2 | 76.4 | N.A. | N.A. | N.A. | N.A. |
| Ts (° C.) | 915 | 919 | 910 | 913 | 910 | 914 | N.A. | N.A. | N.A. | N.A. |
| $10^{2.5}$ dPa · s (° C.) | 1,564 | 1,574 | 1,567 | 1,575 | 1,565 | 1,574 | N.A. | N.A. | N.A. | N.A. |
| TL (° C.) | 1,166 | 1,166 | 1,160 | 1,155 | 1,155 | 1,146 | 1,167 | 1,149 | 1,108 | 1,063 |
| logη at TL (dPa · s) | 4.8 | 4.9 | 4.9 | 5.0 | 4.9 | 5.0 | 4.9 | 5.1 | 5.5 | N.A. |
| Acid resistance (HCl 5 wt % 80° C. 24 h) | 34.5 | 38.1 | 28.4 | 31 | 30.2 | 31.5 | N.A. | N.A. | N.A. | N.A. |
| Alkali resistance (NaOH 5 wt % 80° C. 6 h) | 1.1 | 1.2 | 1.2 | 1.2 | 1.2 | 1.1 | N.A. | N.A. | N.A. | N.A. |
| E (GPa) | N.A. | N.A. | N.A. | N.A. | N.A. | N.A. | N.A. | N.A. | N.A. | N.A. |
| $CS_K$ (MPa) | 1,088 | 1,071 | 1,062 | 1,038 | 1,054 | 1,044 | N.A. | 1,112 | N.A. | N.A. |
| $DOL\_ZERO_K$ (µm) | 23 | 24 | 24 | 27 | 23 | 27 | N.A. | 23.3 | N.A. | N.A. |
| $CS_{Na}$ (MPa) | 265 | 260 | 265 | 257 | 297 | 268 | N.A. | 256 | N.A. | N.A. |
| $DOL\_ZERO_{Na}$ (µm) | 140 | 131 | 134 | 130 | 129 | 129 | N.A. | 106.6 | N.A. | N.A. |

TABLE 21

| (mol %) | No. 199 | No. 200 | No. 201 | No. 202 | No. 203 | No. 204 | No. 205 | No. 206 | No. 207 | No. 208 |
|---|---|---|---|---|---|---|---|---|---|---|
| $SiO_2$ | 60.41 | 60.37 | 60.37 | 65.32 | 65.60 | 65.89 | 66.17 | 59.40 | 59.40 | 59.40 |
| $Al_2O_3$ | 18.80 | 18.80 | 18.80 | 12.83 | 12.48 | 12.13 | 11.79 | 18.80 | 18.80 | 18.80 |
| $B_2O_3$ | 0.10 | 0.10 | 0.10 | 0.40 | 0.41 | 0.43 | 0.45 | 0.20 | 0.20 | 0.20 |
| $Li_2O$ | 7.20 | 7.20 | 7.20 | 1.38 | 1.04 | 0.70 | 0.36 | 7.20 | 7.20 | 8.11 |
| $Na_2O$ | 8.10 | 8.10 | 8.10 | 13.83 | 14.17 | 14.50 | 14.83 | 9.01 | 9.01 | 8.10 |
| $K_2O$ | 0.45 | 0.45 | 0.45 | 1.20 | 1.24 | 1.29 | 1.33 | 0.45 | 0.45 | 0.45 |
| MgO | 0.50 | 0.50 | 0.50 | 4.01 | 4.22 | 4.42 | 4.62 | 0.50 | 0.02 | 0.50 |
| ZnO | 0.00 | 0.00 | 0.00 | 0.00 | 0.00 | 0.00 | 0.00 | 0.00 | 0.00 | 0.00 |
| $P_2O_5$ | 4.30 | 4.30 | 4.30 | 0.81 | 0.61 | 0.40 | 0.20 | 4.30 | 4.78 | 4.30 |
| $SnO_2$ | 0.04 | 0.08 | 0.08 | 0.13 | 0.14 | 0.14 | 0.15 | 0.04 | 0.04 | 0.04 |
| $Fe_2O_3$ | 0.00 | 0.00 | 0.00 | 0.002 | 0.002 | 0.002 | 0.002 | 0.010 | 0.010 | 0.010 |
| $TiO_2$ | 0.00 | 0.00 | 0.00 | 0.002 | 0.002 | 0.002 | 0.002 | 0.010 | 0.010 | 0.010 |
| Cl | 0.10 | 0.10 | 0.10 | 0.09 | 0.09 | 0.09 | 0.09 | 0.01 | 0.01 | 0.01 |
| (Na—Li)/(Al + B + P) | 0.04 | 0.04 | 0.04 | 0.89 | 0.97 | 1.06 | 1.16 | 0.08 | 0.08 | 0.00 |
| (B + Na—P)/(Al + Li) | 0.15 | 0.15 | 0.15 | 0.94 | 1.03 | 1.13 | 1.24 | 0.19 | 0.17 | 0.15 |
| Si + 1.2P—3Al—2Li—1.5Na—K—B | −17.93 | −17.97 | −17.97 | 2.71 | 3.92 | 5.12 | 6.31 | −20.41 | −19.83 | −20.86 |
| ρ (g/cm³) | 2.403 | 2.4033 | 2.4031 | 2.4443 | 2.444 | 2.4452 | 2.4459 | 2.4084 | 2.4014 | 2.4065 |
| $\alpha_{30-380°\,C.}$ (×10⁻⁷/° C.) | 74.8 | 74.2 | N.A. | 89.4 | 90.5 | 90 | 90.4 | 78.8 | 79.4 | 77.2 |
| Ts (° C.) | 926 | 924 | N.A. | 871 | 870 | 867 | 867 | 909 | 912 | 901.5 |
| $10^{2.5}$ dPa · s (° C.) | 1,569 | 1,579 | N.A. | 1,608 | 1,605 | 1,600 | 1,597 | 1,563 | 1,572 | 1,555 |
| TL (° C.) | 1,108 | N.A. | N.A. | N.A. | N.A. | N.A. | N.A. | 1,094 | 1,078 | 1,117 |
| logη at TL (dPa · s) | 5.5 | N.A. | N.A. | N.A. | N.A. | N.A. | N.A. | 5.4 | 5.7 | 5.2 |
| Acid resistance (HCl 5 wt % 80° C. 24 h) | N.A. | N.A. | N.A. | N.A. | N.A. | N.A. | N.A. | 38.4 | 32.8 | 37.6 |
| Alkali resistance (NaOH 5 wt % 80° C. 6 h) | N.A. | N.A. | N.A. | N.A. | N.A. | N.A. | N.A. | 1.2 | 1.4 | 1.3 |
| E (GPa) | N.A. | N.A. | N.A. | N.A. | N.A. | N.A. | N.A. | 75.2 | 74.4 | 76.0 |
| $CS_K$ (MPa) | 1,130 | 1,109 | 1,107 | N.A. | N.A. | N.A. | N.A. | 1,123 | 1,059 | 1,098 |
| $DOL\_ZERO_K$ (µm) | 24.0 | 23.1 | 22.7 | N.A. | N.A. | N.A. | N.A. | 27.5 | 30.8 | 25.7 |
| $CS_{Na}$ (MPa) | 245 | 238 | 244 | N.A. | N.A. | N.A. | N.A. | 275 | 260 | 286 |
| $DOL\_ZERO_{Na}$ (µm) | 110.0 | 111.3 | 109.1 | N.A. | N.A. | N.A. | N.A. | 123.4 | 128.9 | 124.1 |

TABLE 22

| (mol %) | No. 209 | No. 210 | No. 211 | No. 212 | No. 213 | No. 214 | No. 215 |
|---|---|---|---|---|---|---|---|
| $SiO_2$ | 59.40 | 59.61 | 59.41 | 59.61 | 59.61 | 59.41 | 59.40 |
| $Al_2O_3$ | 18.80 | 18.60 | 18.60 | 18.60 | 18.60 | 18.60 | 18.56 |
| $B_2O_3$ | 0.20 | 0.20 | 0.20 | 0.20 | 0.50 | 0.20 | 0.20 |
| $Li_2O$ | 8.11 | 8.11 | 8.11 | 8.11 | 8.11 | 8.11 | 8.11 |
| $Na_2O$ | 8.10 | 8.10 | 8.30 | 8.10 | 8.10 | 8.30 | 8.35 |
| $K_2O$ | 0.45 | 0.45 | 0.45 | 0.15 | 0.15 | 0.15 | 0.45 |
| MgO | 0.02 | 0.50 | 0.50 | 0.50 | 0.50 | 0.50 | 0.02 |
| ZnO | 0.00 | 0.00 | 0.00 | 0.00 | 0.00 | 0.30 | 0.00 |
| $P_2O_5$ | 4.78 | 4.30 | 4.30 | 4.60 | 4.30 | 4.30 | 4.78 |
| $SnO_2$ | 0.04 | 0.03 | 0.03 | 0.03 | 0.03 | 0.03 | 0.03 |
| $Fe_2O_3$ | 0.010 | 0.010 | 0.010 | 0.010 | 0.010 | 0.010 | 0.010 |
| $TiO_2$ | 0.010 | 0.010 | 0.010 | 0.010 | 0.010 | 0.010 | 0.010 |
| Cl | 0.01 | 0.01 | 0.01 | 0.01 | 0.01 | 0.01 | 0.01 |
| (Na—Li)/(Al + B + P) | 0.00 | 0.00 | 0.01 | 0.00 | 0.00 | 0.01 | 0.01 |
| (B + Na P)/(Al + Li) | 0.13 | 0.15 | 0.16 | 0.14 | 0.16 | 0.16 | 0.14 |
| Si + 1.2P—3Al—2Li—1.5Na—K—B | −20.28 | −20.05 | −20.55 | −19.39 | −20.05 | −20.25 | −19.94 |
| ρ (g/cm$^3$) | 2.3997 | 2.4043 | 2.4059 | 2.4018 | 2.4014 | 2.4111 | 2.399 |
| $α_{30\text{-}380° C.}$ (×10$^{-7}$/° C.) | 77.5 | 76.7 | 78.1 | 75.6 | 74.9 | 76.5 | 78.6 |
| Ts (° C.) | 908 | N.A. | N.A. | N.A. | N.A. | N.A. | N.A. |
| $10^{2.5}$ dPa · s (° C.) | 1,562 | N.A. | N.A. | N.A. | N.A. | N.A. | N.A. |
| TL (° C.) | 1,120 | N.A. | N.A. | 1,090 | 1,092 | 1,130 | 1,098 |
| logη at TL (dPa · s) | 5.1 | N.A. | N.A. | N.A. | N.A. | N.A. | N.A. |
| Acid resistance (HCl 5 wt % 80° C. 24 h) | 29.3 | 31 | 35.8 | 23.6 | 27.2 | 35.2 | 25.5 |
| Alkali resistance (NaOH 5 wt % 80° C. 6 h) | 1.3 | N.A. | N.A. | N.A. | N.A. | N.A. | N.A. |
| E (GPa) | 75.0 | 75.4 | 75 | N.A. | N.A. | N.A. | N.A. |
| $CS_K$ (MPa) | 1,044 | 1,108 | 1,109 | 1,087 | 1,104 | 1,120 | 1,044 |
| DOL_ZERO$_K$ (μm) | 29.3 | 26.8 | 26.7 | 25.3 | 24.2 | 23.8 | 29.9 |
| $CS_{Na}$ (MPa) | 291 | 290 | 281 | 296 | 286 | 299 | 226 |
| DOL_ZERO$_{Na}$ (μm) | 130.1 | 124.3 | 132.9 | 134.3 | 126.1 | 120.9 | 153 |

Samples in the tables were each produced as described below. First, glass raw materials were blended so as to give a glass composition shown in the table, and were melted at 1,600° C. for 21 hours in a platinum pot. Subsequently, the resultant molten glass was poured out on a carbon sheet and formed into a flat sheet shape, followed by being cooled in a temperature region of from an annealing point to a strain point at a rate of 3° C./min. Thus, a glass sheet (glass sheet to be tempered) was obtained. The surface of the resultant glass sheet was optically polished so as to give a sheet thickness of 1.5 mm, and then the glass sheet was evaluated for various characteristics.

The density (ρ) is a value measured by a well-known Archimedes method.

The thermal expansion coefficient ($α_{30\text{-}380° C.}$) at from 30° C. to 380° C. is a value for an average thermal expansion coefficient measured with a dilatometer.

The temperature ($10^{2.5}$ dPa·s) at a viscosity at high temperature of $10^{2.5}$ dPa·s is a value measured by a platinum sphere pull up method.

The softening point (Ts) is a value measured based on a method of ASTM C338.

The liquidus temperature (TL) was determined as a temperature obtained as described below. Glass powder which had passed through a standard 30-mesh sieve (500 μm) and remained on a 50-mesh sieve (300 μm) was loaded into a platinum boat, and the platinum boat was kept for 24 hours in a temperature gradient furnace and was then taken out of the furnace. At this time, a highest temperature at which devitrification (devitrified stones) was observed with a microscope in glass was measured. The liquidus viscosity (log η at TL) is a value for a viscosity at the liquidus temperature measured by a platinum sphere pull up method, and is logarithmically represented as log η.

The Young's modulus (E) is a value calculated by a method in conformity with JIS R1602-1995 "Testing methods for elastic modulus of fine ceramics."

The acid resistance test is evaluated as described below. A glass sample having been subjected to mirror polishing treatment on both sides so as to give dimensions of 50 mm×10 mm×1.0 mm was used as a measurement sample. The sample was sufficiently washed with a neutral detergent and pure water, and was then immersed in a 5 mass % HCl aqueous solution warmed to 80° C. for 24 hours. A mass loss (mg/cm$^2$) per unit surface area before and after the immersion was calculated.

The alkali resistance test is evaluated as described below. A glass sample having been subjected to mirror polishing treatment on both sides so as to give dimensions of 50 mm×10 mm×1.0 mm was used as a measurement sample. The sample was sufficiently washed with a neutral detergent and pure water, and was then immersed in a 5 mass % NaOH aqueous solution warmed to 80° C. for 6 hours. A mass loss (mg/cm$^2$) per unit surface area before and after the immersion was calculated.

Subsequently, each of the glass sheets was subjected to ion exchange treatment by being immersed in a $KNO_3$ molten salt at 430° C. for 4 hours. Thus, a tempered glass sheet having a compressive stress layer in a surface thereof was obtained. After that, the glass surface was washed, and the compressive stress value ($CS_K$) and the depth of layer (DOL_ZERO$_K$) of the compressive stress layer on the outermost surface were calculated based on the number of interference fringes observed with a surface stress meter FSM-6000 (manufactured by Orihara Industrial Co., Ltd.) and intervals therebetween. Herein, the "DOL_ZERO$_K$" is a depth at which the compressive stress value becomes zero. In calculation of the stress characteristics, the refractive index and the optical elastic constant of each sample were set to 1.51 and 30.1 [ (nm/cm)/MPa], respectively.

In addition, each of the glass sheets was subjected to ion exchange treatment by being immersed in a $NaNO_3$ molten salt at 380° C. for 1 hour. Thus, a tempered glass sheet was obtained. After that, the glass surface was washed, and the compressive stress value ($CS_{Na}$) and the depth of layer ($DOL\_ZERO_{Na}$) of the compressive stress layer on the outermost surface were calculated based on a phase difference distribution curve observed with a scattered light photoelastic stress meter SLP-1000 (manufactured by Orihara Industrial Co., Ltd.). Herein, the "$DOL\_ZERO_{Na}$" is a depth at which the stress value becomes zero. In calculation of the stress characteristics, the refractive index and the optical elastic constant of each sample were set to 1.51 and 30.1 [(nm/cm)/MPa], respectively.

As apparent from the tables, it is conceived that each of Sample Nos. 1 to 35 and 38 to 215, which has a compressive stress value ($CS_K$) of the compressive stress layer on the outermost surface of 473 MPa or more when having been subjected to the ion exchange treatment with the $KNO_3$ molten salt, and has a compressive stress value ($CS_{Na}$) of the compressive stress layer on the outermost surface of 165 MPa or more when having been subjected to the ion exchange treatment with the $NaNO_3$ molten salt, can be subjected to ion exchange treatment with any of these molten salts, and is hardly broken at the time of dropping. Further, it is conceived that each of Sample Nos. 1 to 35 and 38 to 215, which has a liquidus viscosity of $10^{3.74}$ dPa·s or more, can be formed into a sheet shape. Meanwhile, it is conceived that Sample No. 36, which has a compressive stress value ($CS_{Na}$) of the compressive stress layer of 163 MPa, is liable to be broken at the time of dropping. In addition, it is conceived that Sample No. 37, which has a liquidus viscosity of less than $10^{3.5}$ dPa·s, is difficult to form into a sheet shape.

Moreover, as apparent from Tables 5 to 22, it is conceived that each of Sample Nos. 37 to 215, which has a value for the ($[SiO_2]+1.2\times[P_2O_5]-3\times[Al_2O_3]-2\times[Li_2O]-1.5\times[Na_2O]-[K_2O]-[B_2O_3]$) of −36 mol % or more, has high acid resistance and is therefore easily applied to an acid treatment step, and is thus suitable as a cover glass.

Example 2

First, glass raw materials were blended so as to give glass compositions of Sample No. 2 shown in Table 1 and Sample No. 35 shown in Table 4, and were melted at 1,600° C. for 21 hours in a platinum pot. Subsequently, the resultant molten glass was poured out on a carbon sheet and formed into a flat sheet shape, followed by being cooled in a temperature region of from an annealing point to a strain point at a rate of 3° C./min. Thus, a glass sheet (glass sheet to be tempered) was obtained. The surface of the resultant glass sheet was optically polished so as to give a sheet thickness of 0.7 mm for No. 2, and a sheet thickness of 0.8 mm for No. 35.

The resultant glass sheet to be tempered was subjected to ion exchange treatment by being immersed in a $NaNO_3$ molten salt (concentration of $NaNO_3$: 100 mass %) at 380° C. for 3 hours, and was then subjected to ion exchange treatment by being immersed in a mixed molten salt of $KNO_3$ and $LiNO_3$ (concentration of $LiNO_3$: 2.5 mass %) at 380° C. for 75 minutes. Further, the surface of the resultant tempered glass sheet was washed, and then the stress profile of the tempered glass sheet was measured with a scattered light photoelastic stress meter SLP-1000 (manufactured by Orihara Industrial Co., Ltd.) and a surface stress meter FSM-6000 (manufactured by Orihara Industrial Co., Ltd.). As a result, the same non-monotonic stress profile as in FIG. 1, that is, a stress profile having a first peak, a second peak, a first bottom, and a second bottom was obtained in each case.

Example 3

First, glass raw materials were blended so as to give glass compositions of Sample No. 109 shown in Table 12 and Sample No. 146 shown in Table 15, and were melted at 1,600° C. for 21 hours in a platinum pot. Subsequently, the resultant molten glass was poured out on a carbon sheet and formed into a flat sheet shape, followed by being cooled in a temperature region of from an annealing point to a strain point at a rate of 3° C./min. Thus, a glass sheet (glass sheet to be tempered) was obtained. The surface of the resultant glass sheet was optically polished so as to give a sheet thickness of 0.7 mm.

The resultant glass sheet to be tempered was subjected to ion exchange treatment by being immersed in a $NaNO_3$ molten salt (concentration of $NaNO_3$: 100 mass %) at 380° C. for 3 hours, and was then subjected to ion exchange treatment by being immersed in a mixed molten salt of $KNO_3$ and $LiNO_3$ (concentration of $LiNO_3$:1.5 mass %) at 380° C. for 45 minutes. Further, the surface of the resultant tempered glass sheet was washed, and then the stress profile of the tempered glass sheet was measured with a scattered light photoelastic stress meter SLP-1000 (manufactured by Orihara Industrial Co., Ltd.) and a surface stress meter FSM-6000 (manufactured by Orihara Industrial Co., Ltd.). As a result, the same non-monotonic stress profile as in FIG. 2, that is, a stress profile having a first peak, a second peak, a first bottom, and a second bottom was obtained in each case. Accordingly, it is expected that the resultant tempered glass sheet has a low breakage probability at the time of dropping.

Example 4

First, glass raw materials were blended so as to give a glass composition of Sample No. 147 shown in Table 15, and were melted at 1,600° C. for 21 hours in a platinum pot. Subsequently, the resultant molten glass was poured out on a carbon sheet and formed into a flat sheet shape, followed by being cooled in a temperature region of from an annealing point to a strain point at a rate of 3° C./min. Thus, a glass sheet (glass sheet to be tempered) was obtained. The surface of the resultant glass sheet was optically polished so as to give a sheet thickness of 0.7 mm.

The resultant glass sheet to be tempered was subjected to ion exchange treatment by being immersed in a $NaNO_3$ molten salt (concentration of $NaNO_3$: 100 mass %) at 380° C. for 3 hours, and was then subjected to ion exchange treatment by being immersed in a mixed molten salt of $KNO_3$ and $LiNO_3$ (concentration of $LiNO_3$: 1.5 mass %) at 380° C. for 45 minutes. Further, the surface of the resultant tempered glass sheet was washed, and then the stress profile of the tempered glass sheet was measured with a scattered light photoelastic stress meter SLP-1000 (manufactured by Orihara Industrial Co., Ltd.) and a surface stress meter FSM-6000 (manufactured by Orihara Industrial Co., Ltd.). As a result, the same non-monotonic stress profile as in FIG. 2, that is, a stress profile having a first peak, a second peak, a first bottom, and a second bottom was obtained in each case. Accordingly, it is expected that the resultant tempered glass sheet has a low breakage probability at the time of dropping.

INDUSTRIAL APPLICABILITY

The tempered glass sheet of the present invention is suitable as a cover glass for a touch panel display of a cellular phone, a digital camera, a personal digital assistant (PDA), or the like. In addition, the tempered glass sheet of the present invention is expected to be applied to applications for which high mechanical strength is required, for example, a window glass, a substrate for a magnetic disk, a substrate for a flat panel display, a substrate for a flexible display, a cover glass for a solar cell, a cover glass for a solid state image sensor, and a cover glass for an automobile, in addition to the above-mentioned applications.

The invention claimed is:

1. A tempered glass sheet having a compressive stress layer in a surface thereof,
the tempered glass sheet comprising as a glass composition, in terms of mol %, 50% to 80% of $SiO_2$, 16.25% to 25% of $Al_2O_3$, 0% to 10% of $B_2O_3$, 3% to 15% of $Li_2O$, 3% to 21% of $Na_2O$, 0% to 10% of $K_2O$, 0% to 10% of MgO, 0% to 10% of ZnO, and 2.55% to 15% of $P_2O_5$,
wherein the tempered glass sheet satisfies the following relationship:

$$([SiO_2]+1.2\times[P_2O_5]-3\times[Al_2O_3]-2\times[Li_2O]-1.5\times[Na_2O]-[K_2O]-[B_2O_3]) \le -9.90 \text{ mol \%},$$

wherein the tempered glass sheet satisfies the following relationship:

a molar ratio $([B_2O_3]+[Na_2O]-[P_2O_5])/([Al_2O_3]+[Li_2O]) \ge 0.30$, wherein the tempered glass sheet satisfies the following relationship:

a molar ratio $([Na_2O]-[Li_2O])/([Al_2O_3]+[B_2O_3]+[P_2O_5]) \le 0.151$, and wherein the tempered glass sheet comprises, in terms of mol %, 10% to 16.99% of $([Li_2O]+[Na_2O]+[K_2O])$.

2. The tempered glass sheet according to claim 1, wherein the tempered glass sheet comprises 12 mol % to 16.99 mol % of $([Li_2O]+[Na_2O]+[K_2O])$, and satisfies the following relationship: $[SiO_2]+1.2\times[P_2O_5]-3\times[Al_2O_3]-2\times[Li_2O]-1.5\times[Na_2O]-[K_2O]-[B_2O_3] \ge -22$ mol %.

3. The tempered glass sheet according to claim 1, wherein the tempered glass sheet has a content of $B_2O_3$ of from 0.1 mol % to 4 mol %.

4. The tempered glass sheet according to claim 1, wherein the compressive stress layer has a compressive stress value of from 200 MPa to 1,000 MPa on an outermost surface.

5. The tempered glass sheet according to claim 1, wherein the compressive stress layer has a depth of layer of from 50 μm to 200 μm.

6. The tempered glass sheet according to claim 1, wherein the tempered glass sheet has a temperature at a viscosity at high temperature of $10^{2.5}$ dPa·s of less than 1,650° C.

7. The tempered glass sheet according to claim 1, wherein the tempered glass sheet comprises overflow-merged surfaces in a middle portion thereof in a sheet thickness direction.

8. The tempered glass sheet according to claim 1, wherein the tempered glass sheet comprises, as the glass composition, 2.55 mol % to 15 mol % of $P_2O_5$, and 12 mol % to 16.99 mol % of $([Li_2O]+[Na_2O]+[K_2O])$, and satisfies the following relationship: $[SiO_2]+1.2\times[P_2O_5]-3\times[Al_2O_3]-2\times[Li_2O]-1.5\times[Na_2O]-[K_2O]-[B_2O_3] \ge -22$ mol %.

9. The tempered glass sheet according to claim 1, wherein the tempered glass sheet has a content of $Fe_2O_3$ of from 0.001 mol % to 0.1 mol %.

10. The tempered glass sheet according to claim 1, wherein the tempered glass sheet has a content of $TiO_2$ of from 0.001 mol % to 0.1 mol %.

11. The tempered glass sheet according to claim 1, wherein the tempered glass sheet has a content of $SnO_2$ of from 0.01 mol % to 1 mol %.

12. The tempered glass sheet according to claim 1, wherein the tempered glass sheet has a content of Cl of from 0.001 mol % to 0.1 mol %.

13. The tempered glass sheet according to claim 1, wherein the tempered glass sheet has a stress profile having at least a first peak, a second peak, a first bottom, and a second bottom in a thickness direction.

14. The tempered glass sheet according to claim 1, wherein the tempered glass sheet has a content of $Al_2O_3$ of from 18 mol % to 25 mol %.

15. A cover glass for a touch panel display, the cover glass comprising the tempered glass sheet according to claim 1.

16. A glass sheet to be tempered, comprising as a glass composition, in terms of mol %, 50% to 80% of $SiO_2$, 16.25% to 25% of $Al_2O_3$, 0% to 10% of $B_2O_3$, 3% to 15% of $Li_2O$, 3% to 21% of $Na_2O$, 0% to 10% of $K_2O$, 0% to 10% of MgO, 0% to 10% of ZnO, and 2.55% to 15% of $P_2O_5$,
wherein the glass sheet to be tempered satisfies the following relationship:

$$([SiO_2]+1.2\times[P_2O_5]-3\times[Al_2O_3]-2\times[Li_2O]-1.5\times[Na_2O]-[K_2O]-[B_2O_3]) \le -9.90 \text{ mol \%},$$

wherein the glass sheet to be tempered satisfies the following relationship:

a molar ratio $([B_2O_3]+[Na_2O]-[P_2O_5])/([Al_2O_3]+[Li_2O]) \ge 0.30$, wherein the glass sheet to be tempered satisfies the following relationship:

a molar ratio $([Na_2O]-[Li_2O])/([Al_2O_3]+[B_2O_3]+[P_2O_5]) \le 0.151$, and wherein the glass sheet to be tempered comprises, in terms of mol %, 10% to 16.99% of $([Li_2O]+[Na_2O]+[K_2O])$.

17. A method of manufacturing a tempered glass sheet, comprising:
a preparation step of preparing a glass sheet to be tempered including as a glass composition, in terms of mol %, 50% to 80% of $SiO_2$, 16.25% to 25% of $Al_2O_3$, 0% to 10% of $B_2O_3$, 3% to 15% of $Li_2O$, 3% to 21% of $Na_2O$, 0% to 10% of $K_2O$, 0% to 10% of MgO, 0% to 10% of ZnO, and 2.55% to 15% of $P_2O_5$; and
an ion exchange step of subjecting the glass sheet to be tempered to ion exchange treatment a plurality of times, to thereby obtain a tempered glass sheet having a compressive stress layer in a surface thereof,
wherein the glass sheet to be tempered satisfies the following relationship:

$$([SiO_2]+1.2\times[P_2O_5]-3\times[Al_2O_3]-2\times[Li_2O]-1.5\times[Na_2O]-[K_2O]-[B_2O_3]) \le -9.90 \text{ mol \%},$$

wherein the glass sheet to be tempered satisfies the following relationship:

a molar ratio $([B_2O_3]+[Na_2O]-[P_2O_5])/([Al_2O_3]+[Li_2O]) \ge 0.30$, wherein the glass sheet to be tempered satisfies the following relationship:

a molar ratio $([Na_2O]-[Li_2O])/([Al_2O_3]+[B_2O_3]+[P_2O_5]) \leq 0.151$, and wherein the glass sheet to be tempered comprises, in terms of mol %, 10% to 16.99% of $([Li_2O]+[Na_2O]+[K_2O])$.

* * * * *